US008639047B2

(12) United States Patent
Han et al.

(10) Patent No.: US 8,639,047 B2
(45) Date of Patent: Jan. 28, 2014

(54) INTRAPREDICTION/INTERPREDICTION METHOD AND APPARATUS

(75) Inventors: Woo-jin Han, Suwon-si (KR); Jeong-hoon Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 877 days.

(21) Appl. No.: 12/017,453

(22) Filed: Jan. 22, 2008

(65) Prior Publication Data

US 2008/0175492 A1 Jul. 24, 2008

(30) Foreign Application Priority Data

Jan. 22, 2007 (KR) .......................... 10-2007-0006695

(51) Int. Cl.
*G06K 9/36* (2006.01)
*G06K 9/46* (2006.01)

(52) U.S. Cl.
USPC ......................................................... 382/236

(58) Field of Classification Search
None
See application file for complete search history.

(56) References Cited

U.S. PATENT DOCUMENTS

| | | | | |
|---|---|---|---|---|
| 6,104,439 | A * | 8/2000 | Jeong et al. ................... | 348/699 |
| 6,148,109 | A * | 11/2000 | Boon et al. ...................... | 382/238 |
| 6,950,469 | B2 * | 9/2005 | Karczewicz et al. .... | 375/240.17 |
| 7,738,714 | B2 * | 6/2010 | Lee et al. ....................... | 382/236 |
| 7,778,459 | B2 * | 8/2010 | Song .............................. | 382/166 |
| 2003/0223645 | A1 | 12/2003 | Sun et al. | |
| 2004/0008771 | A1 | 1/2004 | Karczewicz | |
| 2005/0201633 | A1* | 9/2005 | Moon et al. .................... | 382/268 |
| 2006/0222066 | A1* | 10/2006 | Yoo et al. ................. | 375/240.03 |
| 2006/0268982 | A1* | 11/2006 | Lee et al. ................. | 375/240.03 |
| 2006/0274956 | A1* | 12/2006 | Sohn et al. ..................... | 382/238 |
| 2007/0076964 | A1* | 4/2007 | Song .............................. | 382/238 |
| 2007/0098067 | A1* | 5/2007 | Kim et al. ................ | 375/240.08 |

FOREIGN PATENT DOCUMENTS

JP 2006-180298 A 7/2006

OTHER PUBLICATIONS

Search Report dated Dec. 13, 2010 issued in counterpart European Application No. 08704770.0.
Bormans et al. "Video coding with H.264/AVC: tools, performance, and complexity", IEEE Circuits and Systems Magazine, IEEE Service Center, vol. 4, No. 1, Jan. 2004, pp. 7-28.
Communication dated May 13, 2013 from the Korean Intellectual Property Office in a counterpart application No. 10-2007-0006695.
Communication dated Sep. 14, 2011, issued by the European Patent Office in counterpart European Application No. 08704770.0.
Takahashi, Masashi et al. "TSIP: Improved intra prediction method." 33. VCEG Meeting; 82 MPEG Meeting. ITU-T. Shenzhen, China. Oct. 20, 2007. p. 1-5.
Communication dated Feb. 16, 2012 from the State Intellectual Property Office of P.R. China in counterpart Chinese application No. 200880009363.4.

* cited by examiner

*Primary Examiner* — Samir Ahmed
(74) *Attorney, Agent, or Firm* — Sughrue Mion, PLLC

(57) ABSTRACT

An intraprediction/inter prediction method and apparatus is provided. In a method of intrapredicting an image processing unit of a current picture, the image processing unit including a plurality of sub blocks, a first prediction value of the image processing unit is generated by intrapredicting each of the sub blocks using pixels neighboring each of the sub blocks. A second prediction value of the image processing unit is generated by intrapredicting each of the sub blocks using pixels neighboring each of the sub blocks included in the first prediction value. Accordingly, an intrapredicted value or an intrapredicted motion vector can be more accurately obtained, so that the compression rate of image encoding is improved.

36 Claims, 16 Drawing Sheets

INTRAPREDICTION/INTERPREDICTION METHOD AND APPARATUS

CROSS-REFERENCE TO RELATED PATENT APPLICATION

This application claims the benefit of Korean Patent Application No. 10-2007-0006695, filed on Jan. 22, 2007, in the Korean Intellectual Property Office, the disclosure of which is incorporated herein in its entirety by reference.

BACKGROUND OF THE INVENTION

1. Field of the Invention

The present invention relates to an intraprediction/interprediction method and apparatus, and more particularly, to a method and apparatus for encoding and decoding an image by performing more accurate intraprediction/interprediction with respect to an image processing unit including a plurality of sub blocks.

2. Description of the Related Art

In an image compression technique such as MPEG-1, MPEG-2, and MPEG-4H.264/MPEG-4 advanced video coding (AVC), in order to encode an image, a picture is divided into predetermined image processing units, for example, into macroblocks. The macroblocks are encoded by interprediction and intraprediction. Then, an optimal encoding mode is selected in consideration of the size of the data of the encoded macroblocks and the degree of distortion of the original macroblocks.

In intraprediction, in order to encode each of the blocks of a current picture, a reference picture is not referred to, but instead a value of a pixel spatially adjacent to each block that is to be encoded is referred to. First, a predicted pixel value of a current block that is to be encoded is calculated by referring to a value of a pixel adjacent to the current block. Then, only a residue corresponding to a difference between the predicted pixel value and the actual pixel value of the current block is encoded. Intraprediction modes are roughly divided into intraprediction modes for luminance, such as a 4×4 intraprediction mode, an 8×8 intraprediction mode, and a 16×16 intraprediction mode, and intraprediction modes for chrominance.

FIGS. 1A and 1B illustrate conventional intraprediction modes.

FIG. 1A illustrates conventional 16×16 intraprediction modes. Referring to FIG. 1A, there exist a total of 4 conventional 16×16 intraprediction modes, namely, a vertical mode, a horizontal mode, a DC (direct current) mode, and a plane mode.

FIG. 1B illustrates conventional 4×4 intraprediction modes. Referring to FIG. 1B, there exist a total of 9 conventional 4×4 intraprediction modes, namely, a vertical mode, a horizontal mode, a DC mode, a diagonal down-left mode, a diagonal down-right mode, a vertical right mode, a vertical left mode, a horizontal-up mode, and a horizontal-down mode.

In image encoding according to the H.264 standard, a current macroblock is encoded in a total of 13 modes including the 4×4 intraprediction modes and 16×16 intraprediction modes, and thus intraprediction encoding is performed in an optimal mode from among the 13 modes. The optimal mode is selected in consideration of a residue and a distortion between the original block and a predicted block.

Interprediction is a technique of compressing an image by removing temporal duplication between pictures. A motion estimation encoding technique is representative of interprediction. Motion estimation encoding is a technique of encoding an image by estimating a motion of a current picture on a block-by-block basis with reference to at least one reference picture and compensating for the estimated motion.

In motion estimation encoding, a block that is the most similar to a current block is searched for within a predetermined range of a reference picture by using a predetermined estimation function. When the most similar block is found, only a residue between the most similar block found from the reference picture and the current block is transmitted, thereby increasing the compression rate of data. Here, various sizes of blocks, such as, 16×16, 8×16, and 8×8, may be used as a block.

FIGS. 2A through 2D illustrate motion vector prediction performed in conventional interprediction. In FIGS. 2A through 2D, a method of predicting a motion vector of a current block 210 according to the H.264 standard is illustrated.

FIG. 2A illustrates a case where the current block 210 and neighboring blocks 221 through 223 have the same size. In this case, in the H.264 standard, a predicted motion vector corresponding to a predicted value of the motion vector of the current block 210 is determined according to a relation whereby the predicted motion vector equals center values mvA, mvB, and mvC. Since neighboring blocks are likely to have similarities, the motion vector of the current block 210 is determined to be the center values mvA, mvB, and mvC of the motion vectors of the neighboring blocks 221 through 223.

FIG. 2B illustrates a case where the current block 210 and the neighboring blocks 231 through 233 have different sizes. In this case, as shown in FIG. 2B, a center value mvA of a block 231 being at the uppermost location from among the blocks neighboring the left side of the current block 210, a center value mvB of a block 232 being at the leftmost location from among the blocks neighboring the upper side of the current block 210, and a center value mvC of a block 233 being at the leftmost location from among the blocks neighboring the right upper side of the current block 210 are determined as a predicted motion vector of the current block 210.

FIG. 2C illustrates a case where a current block 211 or 212 is not a square, that is, a case where the current block 211 or 212 is an 8×16 block.

When a current block is a block 211 which forms a square together with a block 212, the motion vector of a block 241 on the left side of the current block 211 is determined to be a predicted motion vector of the current block 211. On the other hand, when a current block is the block 212, the motion vector of a block 242 on the right upper side of the current block 211 is determined to be a predicted motion vector of the current block 212.

FIG. 2D illustrates a case where a current block 213 or 214 is not a square, that is, the current block 213 or 214 is a 16×8 block.

When a current block is a block 213 which forms a square together with a block 214, the motion vector of a block 251 on the left side of the current block 213 is determined to be a predicted motion vector of the current block 213. On the other hand, when a current block is the block 214, the motion vector of a block 252 on the upper side of the current block 214 is determined to be a predicted motion vector of the current block 214.

When a predicted motion vector of a current block is determined, a differential value between the predicted motion vector and an actual motion vector of the current block is encoded and inserted into a bitstream. Instead of transmitting information about the motion vector of the current block without changes to the information, the differential value is encoded and the encoded differential value is transmitted. Therefore, the compression rate of image data is increased.

In the intraprediction shown in FIGS. 1A and 1B, when the pixel value of the current block is more accurately predicted, the residue of the current block is decreased, and thus the compression rate for image encoding is increased. In the interprediction shown in FIGS. 2A through 2D, when a more accurately predicted motion vector corresponding to a predicted value of the motion vector of the current block is obtained, a differential value between the actual motion vector and the predicted motion vector of the current block is decreased, and thus the compression rate for image encoding is increased.

Therefore, an image encoding/decoding method, in which a pixel value of a current block can be more accurately predicted in intraprediction and a more accurately predicted motion vector of the current block can be obtained, is demanded.

SUMMARY OF THE INVENTION

The present invention provides an intraprediction/interprediction method and apparatus capable of more accurately predicting an intraprediction value and a motion vector of a current block, and a computer-readable recording medium having a recorded program for executing the intraprediction/interprediction method.

According to an aspect of the present invention, there is provided a method of intrapredicting an image processing unit of a current picture, the image processing unit including a plurality of sub blocks, the method comprising the operations of generating a first prediction value of the image processing unit by intrapredicting each of the sub blocks using pixels neighboring each of the sub blocks, and generating a second prediction value of the image processing unit by intrapredicting each of the sub blocks using pixels neighboring each of the sub blocks included in the first prediction value.

The intrapredicting method further comprises the operation of generating a final prediction value of the image processing unit by setting the second prediction value as an initial value and performing at least once an operation of generating the next prediction value of the image processing unit by intrapredicting the sub blocks of the image processing unit by using pixels adjacent to each of the sub blocks of the previous prediction value.

According to another aspect of the present invention, there is provided an apparatus for intrapredicting an image processing unit of a current picture, the image processing unit including a plurality of sub blocks, the apparatus comprising: a first intraprediction performing unit which generates a first prediction value of the image processing unit by intrapredicting each of the sub blocks using pixels neighboring each of the sub blocks; and a second intraprediction performing unit which generates a second prediction value of the image processing unit by intrapredicting each of the sub blocks using pixels neighboring each of the sub blocks included in the first prediction value.

The second intraprediction performing unit may generate a final prediction value of the image processing unit by setting the second prediction value as an initial value and performing at least once an operation of generating the next prediction value of the image processing unit by intrapredicting the sub blocks of the image processing unit by using pixels adjacent to each of the sub blocks of the previous prediction value.

According to another aspect of the present invention, there is provided a method of interpredicting an image processing unit of a current picture, the image processing unit including a plurality of sub blocks, the method comprising the operations of: generating a first prediction value of the image processing unit by interpredicting each of the sub blocks using pixels neighboring each of the sub blocks; and generating a second prediction value of the image processing unit by interpredicting each of the sub blocks using pixels neighboring each of the sub blocks included in the first prediction value.

The interpredicting method may further comprise the operation of generating a final prediction value of the image processing unit by setting the second prediction value as an initial value and performing at least once an operation of generating the next prediction value of the image processing unit by interpredicting the sub blocks of the image processing unit by using pixels adjacent to each of the sub blocks of the previous prediction value.

According to another aspect of the present invention, there is provided an apparatus for interpredicting an image processing unit of a current picture, the image processing unit including a plurality of sub blocks, the apparatus comprising: a first interprediction performing unit which generates a first prediction value of the image processing unit by interpredicting each of the sub blocks using pixels neighboring each of the sub blocks; and a second interprediction performing unit which generates a second prediction value of the image processing unit by interpredicting each of the sub blocks using pixels neighboring each of the sub blocks included in the first prediction value.

The second interprediction performing unit may generate a final prediction value of the image processing unit by setting the second prediction value as an initial value and performing at least once an operation of generating the next prediction value of the image processing unit by interpredicting the sub blocks of the image processing unit by using pixels adjacent to each of the sub blocks of the previous prediction value.

According to another aspect of the present invention, there is provided a computer readable recording medium having recorded thereon a computer program for the intraprediction method and/or the interprediction method.

BRIEF DESCRIPTION OF THE DRAWINGS

The above and other features of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 3:
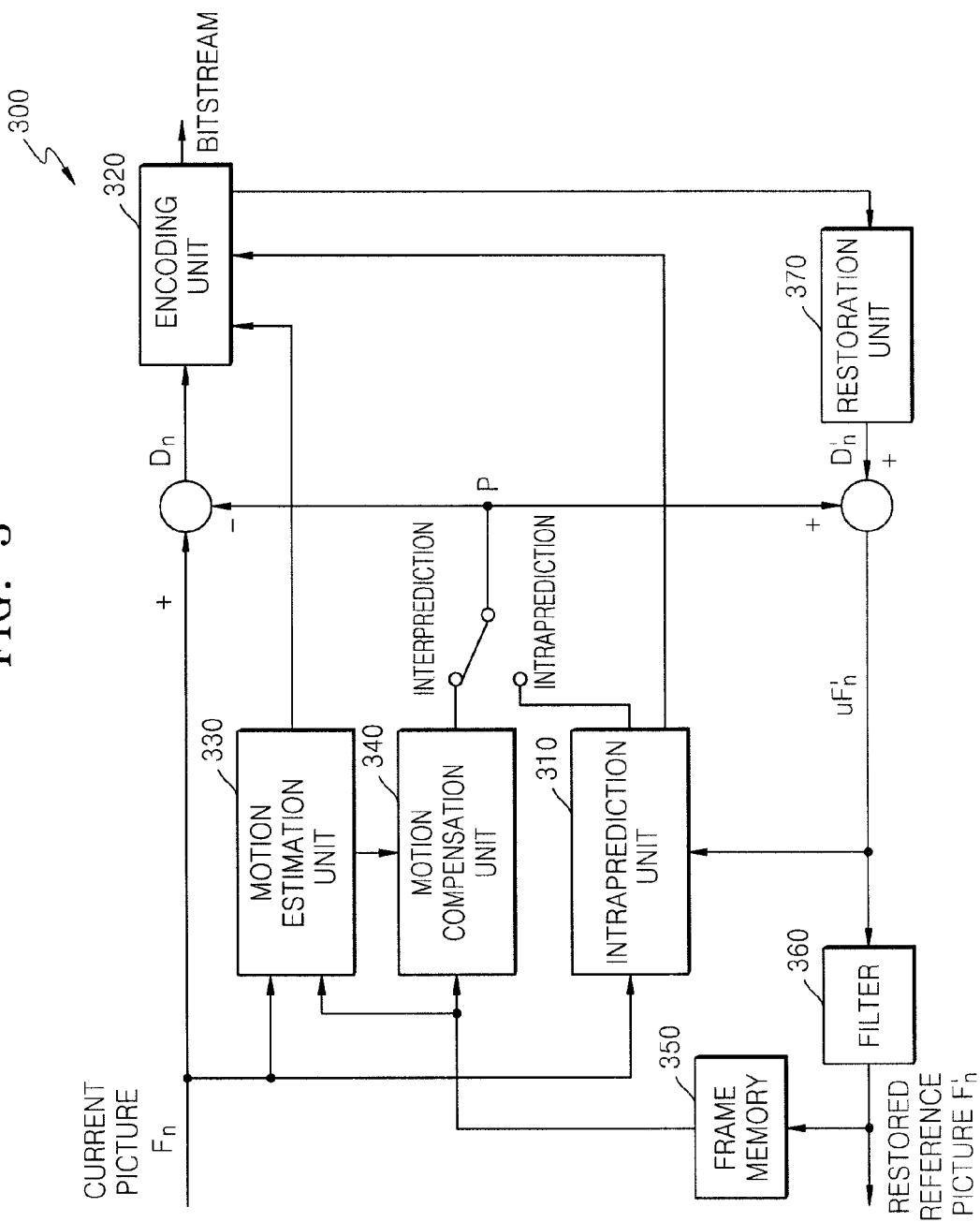
FIG. 3 is a block diagram of an image encoding apparatus according to an exemplary embodiment of the present invention.

FIG. 3 is a block diagram of an image encoding apparatus 300 according to an exemplary embodiment of the present invention. An image encoding apparatus based on the H.264 standard will now be described, to which an intraprediction/interprediction apparatus according to the present invention is applied. However, it will be easily understood by one of ordinary skill in the art to which the present invention pertains, that the intraprediction/interprediction apparatus according to the present invention may be applied to different types of image encoding apparatuses based on intraprediction/interprediction.

Referring to FIG. 3, the image encoding apparatus 300 includes an intraprediction unit 310, an encoding unit 320, a motion estimation unit 330, a motion compensation unit 340, a frame memory 350, a filter 360, and a restoration unit 370. The intraprediction unit 310 and the motion estimation unit 330 correspond to the intraprediction/interprediction apparatus according to the present invention.

First, intraprediction encoding will now be described. The intraprediction unit 310 performs intraprediction for searching a current picture for a predicted value of a block to be encoded. In particular, in order to encode a predetermined unit by which an image is processed (hereinafter, referred to as a predetermined image-processing unit), the intraprediction unit 310 predicts prediction values of the sub blocks included in the predetermined image-processing unit, by using pixels adjacent to each of the sub blocks. The intraprediction unit 310 also generates more accurate predicted values of the sub blocks by repeating such intraprediction. The intraprediction unit 310 will now be described in greater detail with reference to FIG. 4.

Figure 4:
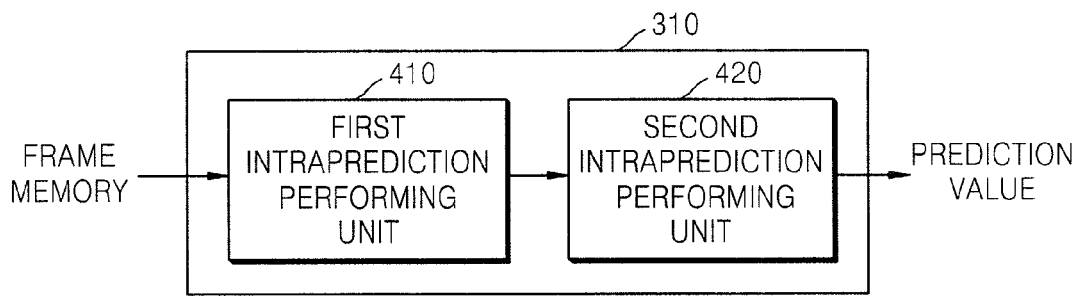
FIG. 4 is a block diagram of an intraprediction unit of the image encoding apparatus shown in FIG. 3.

FIG. 4 is a block diagram of the intraprediction unit 310 of the image encoding apparatus 300. Referring to FIG. 4, the intraprediction unit 310 includes a first intraprediction performing unit 410 and a second intraprediction performing unit 420.

Figure 1A:
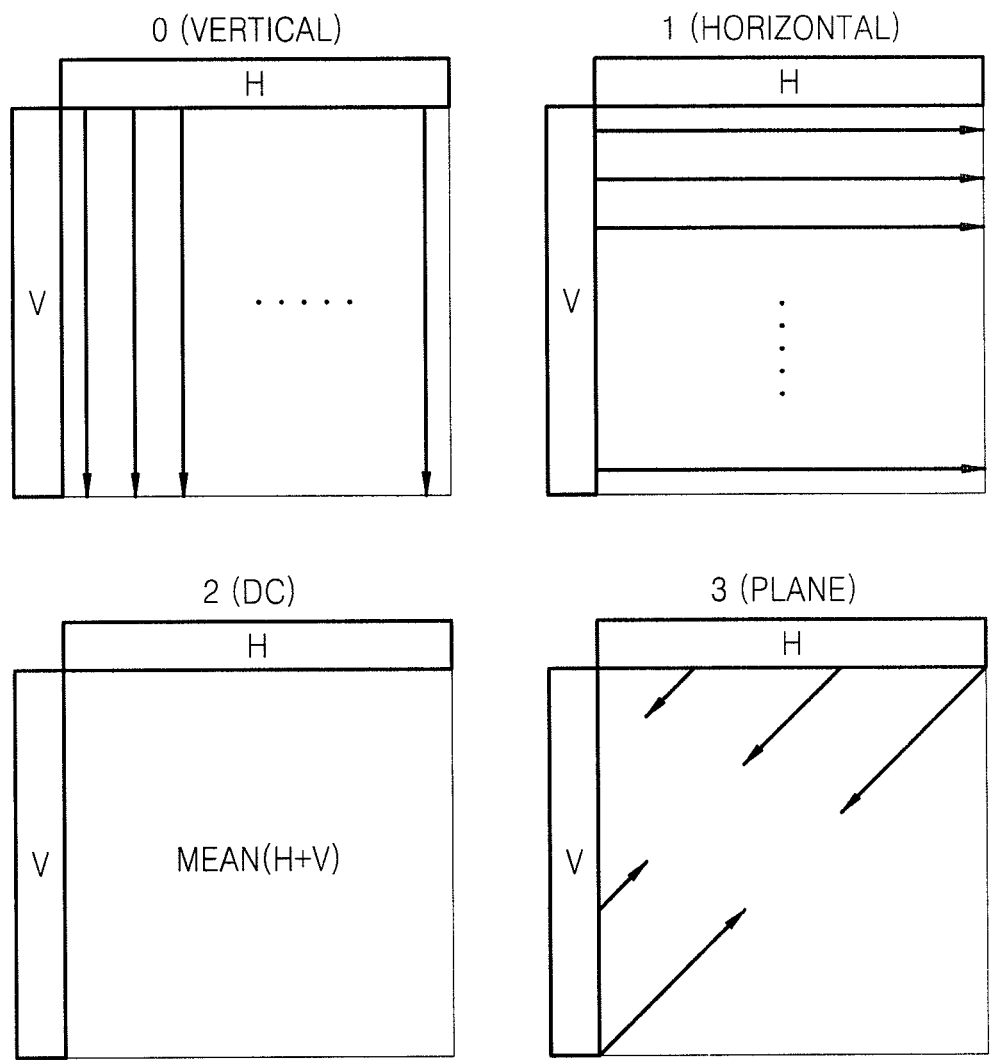
FIGS. 1A and 1B illustrate conventional intraprediction modes.
Figure 1B:
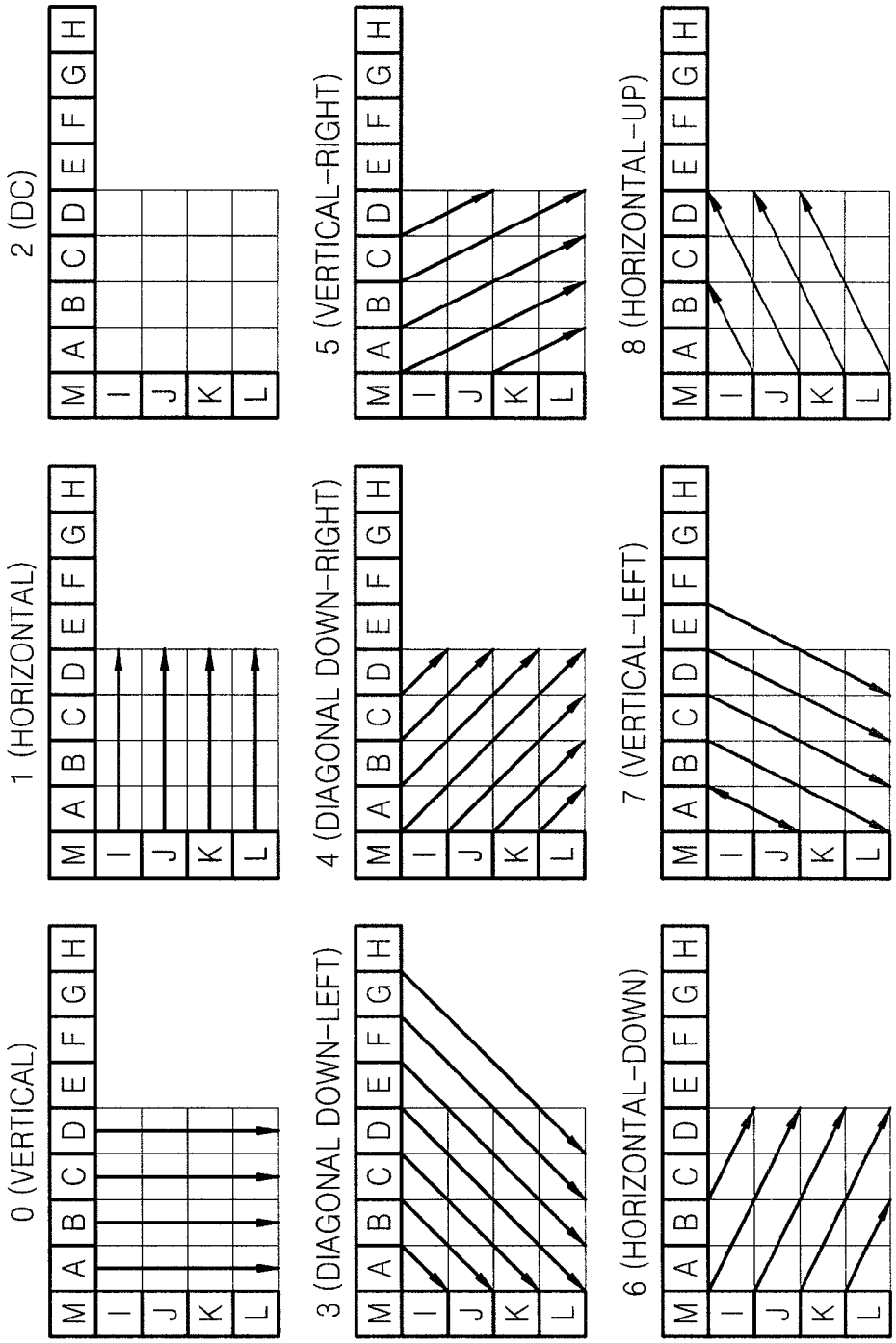
Figure 2A:
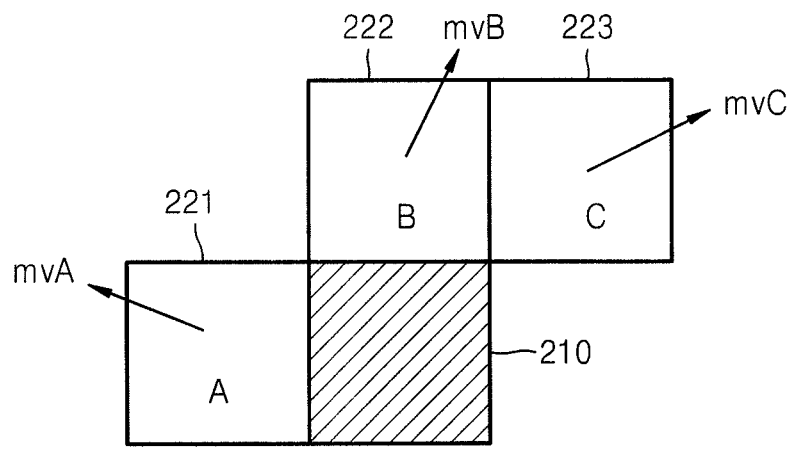
FIGS. 2A through 2D illustrate motion vector prediction performed in conventional interprediction.
Figure 2B:
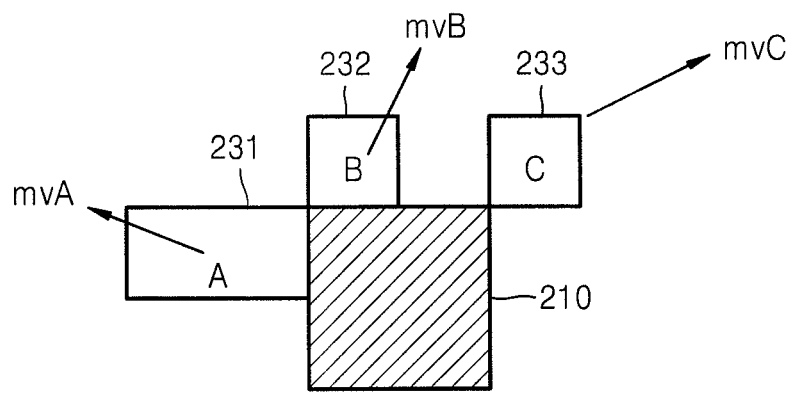
Figure 2C:
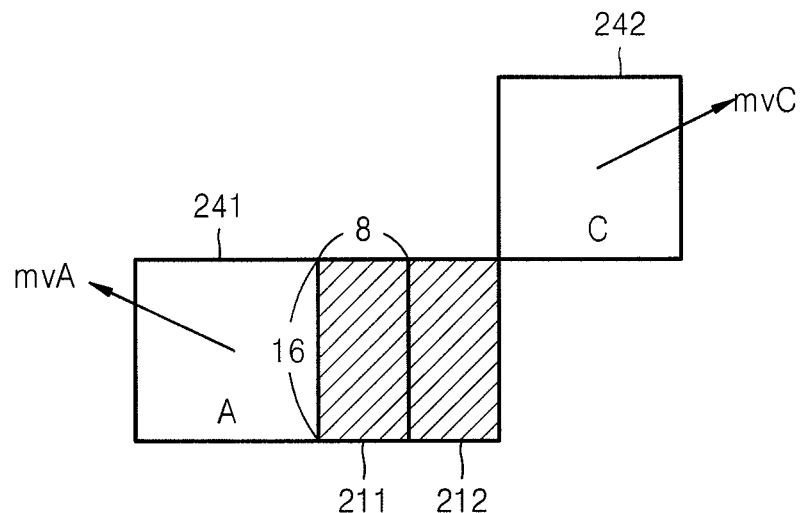
Figure 2D:
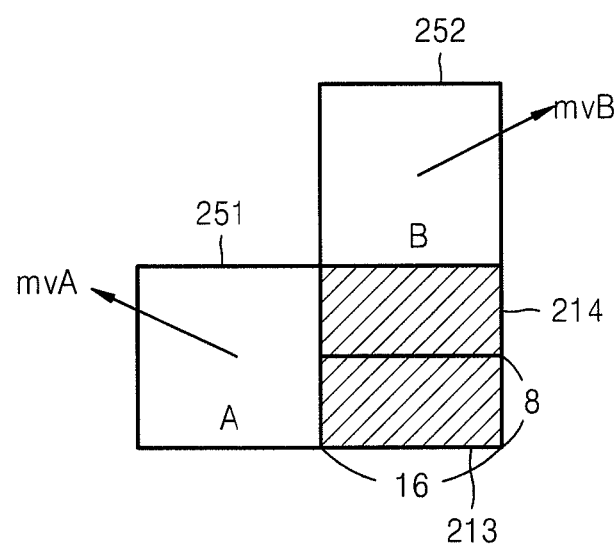

The first intraprediction performing unit 410 performs a first intraprediction for generating a first prediction value of a predetermined image processing unit, by intrapredicting the sub blocks of the predetermined image processing unit by using the pixels adjacent to each of the sub blocks. The predetermined image processing unit may be a 16×16 macroblock. There is no limit to how the intraprediction is performed, and intraprediction using the intraprediction directions shown in FIGS. 1A and 1B may be used.

Figure 5A:
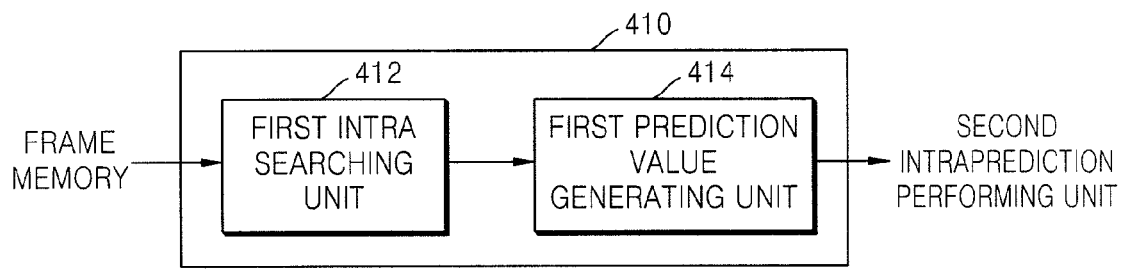
FIG. 5A is a block diagram of a first intraprediction performing unit of the intraprediction unit shown in FIG. 4.

FIG. 5A is a block diagram of the first intraprediction performing unit 410 of the intraprediction unit 310. Referring to FIG. 5A, the first intraprediction performing unit 410 includes a first intra searching unit 412 and a first prediction value generating unit 414.

The first intra searching unit 412 searches an already-encoded area of a current picture stored in the frame memory 350, by using pixels adjacent to the sub blocks. This first intra searching operation will be described in greater detail with reference to FIG. 6.

Figure 6:
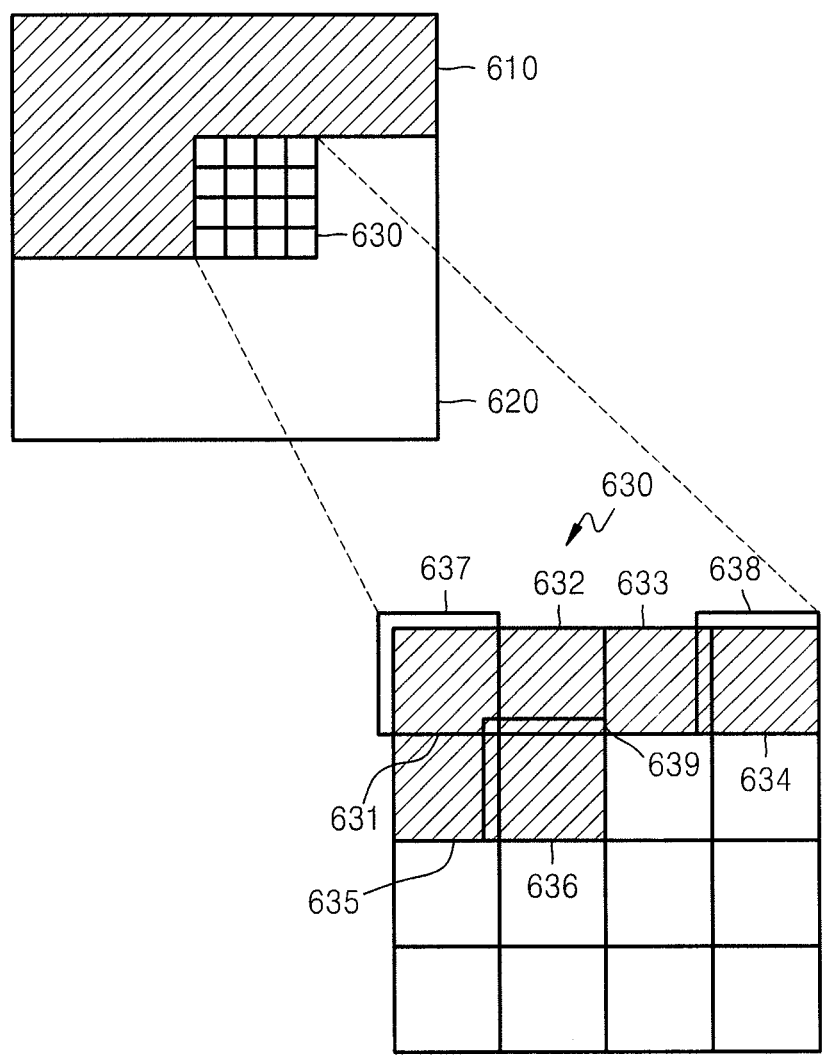
FIG. 6 illustrates a method of generating a first prediction value, according to an exemplary embodiment of the present invention.

FIG. 6 illustrates a method of generating a first prediction value of a current image-processing unit 630, according to an exemplary embodiment of the present invention. Referring to FIG. 6, the current picture is divided into an area 610 already encoded before the current image-processing unit 630 is encoded, and a non-encoded area 620. In order to generate the first prediction value of the current image-processing unit 630, the first intra searching unit 412 uses pixels 637 through 639 neighboring sub blocks 631 through 636 that are included in the current image-processing unit 630.

The first intra searching unit 412 performs a prediction in a rightward direction starting from a sub block corresponding to a left upper part of the current image-processing unit 630. When prediction with respect to a line of sub blocks 631 through 634 is completed, a next line of sub blocks 635 and 636 is predicted.

In order to predict the sub block 631 corresponding to the left upper part of the current image processing unit 630, the first intra searching unit 412 performs a search by using pixels 637 neighboring the sub block 631 from among the pixels included in the encoded area 610, which has already been encoded before encoding the current picture. In the present exemplary embodiment, a search is performed using pixels adjacent to a left side and an upper side of the sub block 631.

The encoded area 610, which has been encoded before encoding the current picture, is searched using the neighboring pixels 637 in order to find pixels similar to the neighboring pixels 637, namely, to find pixels having small residues.

Prediction of the sub block 632 will now be described. Pixels that can be used in intraprediction from among the pixels adjacent to the sub block 632 are only pixels adjacent to the upper part of the sub block 632 from among the pixels included in the previously encoded area 610, and pixels included in the previously predicted sub block 631, which is adjacent to the left side of the sub block 632. Accordingly, in order to perform intraprediction on the current sub block 632, the first intra searching unit 412 performs a search using the pixels adjacent to the current sub block 632 from among the pixels included in the previously encoded area 610 of the current picture, and the pixels included in the previously predicted sub block 631 of the image-processing unit 630. As in the prediction of the initially intrapredicted sub block 631, the previously encoded area 610 of the current picture is searched using the pixels adjacent to the sub block 632.

The other sub blocks 633 and 634 in the first row are predicted in the same way as the way of predicting the sub blocks 631 and 632.

When the sub blocks in the second row are predicted, a search using the pixels adjacent to the left side and the upper side of each sub block is performed as in the prediction of the first row of sub blocks. However, the prediction of the sub block 636 in the second row is different from that of the first row of sub blocks in that the neighboring pixels used in the prediction of the sub block 636 are all included in the previously-predicted sub blocks included in the current image processing unit 630. As shown in FIG. 6, the pixels that can be used in the prediction of the sub block 636 are only the pixels included in the previously predicted sub blocks 631, 632, and 635 of the current image-processing unit 630.

Accordingly, the first intra searching unit 412 searches the previously encoded area 610 of the current picture by using pixels 639 included in the previously-predicted sub blocks 631, 632, and 635.

When intraprediction is performed on a current sub block of a current image-processing unit of a current picture, a search is not performed using the pixels included in the current sub block but using only the pixels neighboring the current sub block. Also, since the neighboring pixels are pixels included in an area of the current picture that is encoded before encoding the current sub block, and/or pixels included in sub blocks of the current image processing unit that have been predicted before predicting the current sub block, information that specifies sub blocks found by the searching operation, so as to be used in the prediction of the current sub block, is not needed. In other words, in decoding, the intrapredicted value of the current sub block can be generated even without special information about the sub block used in the intraprediction of the current sub block.

Referring back to FIG. 5A, the first prediction value generating unit 414 generates a prediction value of a current image processing unit according to a result of the search performed by the first intra searching unit 412. This predicted value is an initially-generated prediction value of the current image processing unit, and is thus set to be a first prediction value of the current image processing unit.

When the first intra searching unit 412 searches an encoded area of the current picture by using the pixels neighboring each of the sub blocks of the current image processing unit, pixels similar to the neighboring pixels are found from the encoded area of the current picture. The first prediction value generating unit 414 determines the pixel values of the sub blocks adjacent to the found similar pixels to be the predicted values of the sub-blocks of the current image processing unit, thereby generating the first prediction value of the current image processing unit.

Referring back to FIG. 4, the first intraprediction performing unit 410 generates a first prediction value 640 (illustrated in FIG. 7) by intrapredicting the current image processing unit 630. The second intraprediction performing unit 420 generates a second prediction value 710 (illustrated in FIG. 7) of the current image processing unit 630 by intrapredicting each of the sub blocks of the current image processing unit 630 by using pixels adjacent to each of the sub blocks included in the first prediction value 640. Preferably, a third prediction value of the current image processing unit 630 may be generated on the basis of the second prediction value, and a fourth prediction value thereof may be generated on the basis of the third prediction value. In this way, such prediction value generation may repeat a predetermined number of times.

The first intraprediction performing unit 412 uses only the pixels adjacent to the left and upper sides of each sub block from among all of the pixels adjacent to each sub block, when searching the previously encoded area 610 of the current picture in order to perform intraprediction. However, when intrapredicting a current sub block, the second intraprediction performing unit 414 is able to use all of the neighboring pixels, in other words, even the pixels located on the right and lower sides of the current sub block, because the second intraprediction performing unit 414 performs a search on the basis of the first prediction value 640 of the current image processing unit generated by the first intraprediction performing unit 412. The search performed by the second intraprediction performing unit 414 will be described in greater detail later with reference to FIG. 7.

Figure 5B:
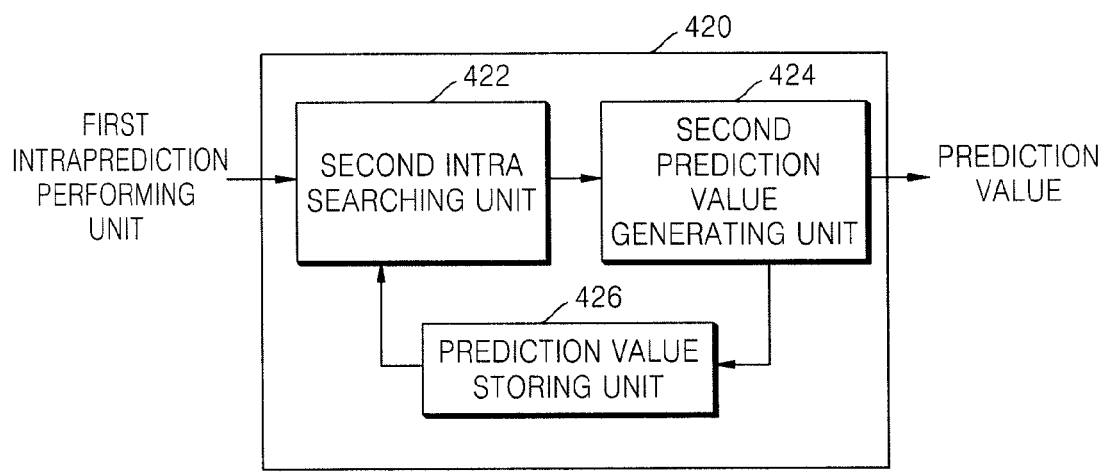
FIG. 5B is a block diagram of a second intraprediction performing unit of the intraprediction unit shown in FIG. 4.

FIG. 5B is a block diagram of the second intraprediction performing unit 420 of the intraprediction unit 310.

Referring to FIG. 5B, the second intraprediction performing unit 420 includes a second intra searching unit 422, a second prediction value generating unit 424, and a prediction value storage unit 426.

The second intra searching unit 422 searches the previously encoded area 610 of the current picture by using pixels neighboring each of the sub blocks included in the first prediction value of the current image processing unit. As described above, since the second intra searching unit 422 performs a search on the basis of the first prediction value 640 of the current image processing unit 630 generated by the first intraprediction performing unit 412, the second intra searching unit 422 is able to use all of the pixels neighboring each sub block.

Figure 7:
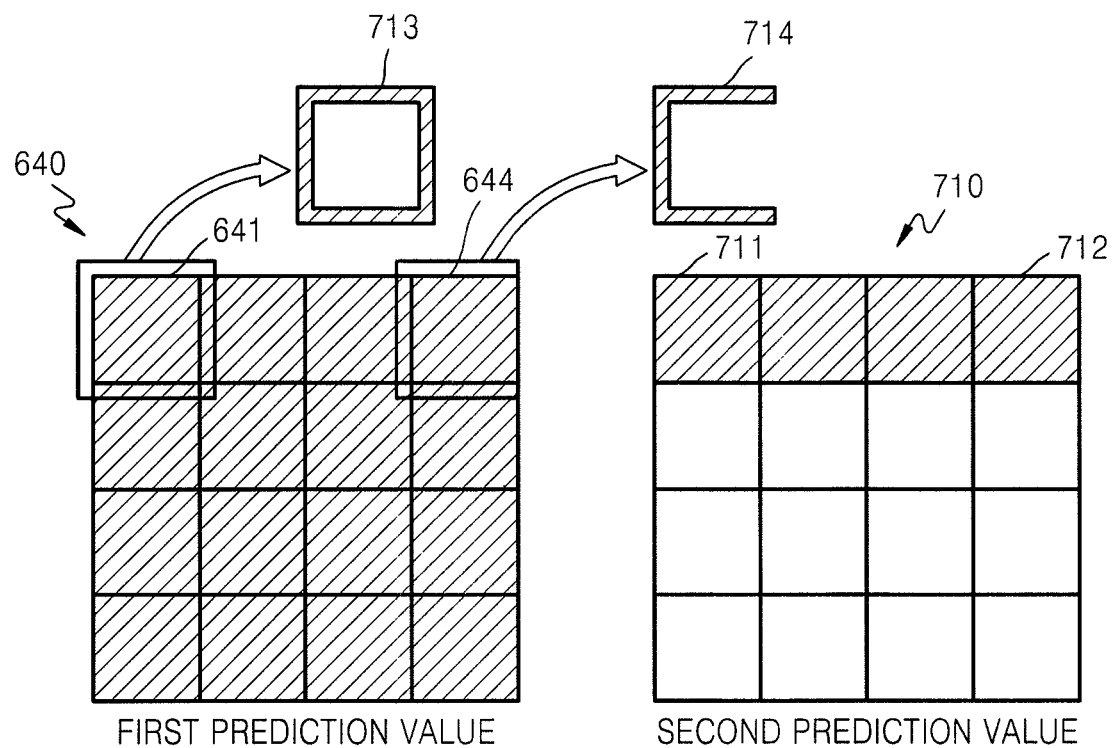
FIG. 7 illustrates a method of generating a second prediction value, according to an exemplary embodiment of the present invention.

FIG. 7 illustrates a method of generating a second prediction value 710 of the current image-processing unit 630, according to an exemplary embodiment of the present invention. In FIG. 7, the second prediction value 710 is generated on the basis of the first prediction value generated by the first intraprediction performing unit 410, that is, the first prediction value 640.

Referring to FIG. 7, the second intra searching unit 422 uses the first prediction value 640 in order to generate the second prediction value 710. When the first intraprediction performing unit 410 generates the first prediction value 640 according to the method illustrated in FIG. 6, the first intraprediction performing unit 410 is able to use only the pixels adjacent to each sub block from among the pixels included in the previously encoded area 610 of the current picture, and/or the pixels included in the previously predicted sub blocks of the current image processing unit 630.

However, when generating the second prediction value 710, the second intra searching unit 422 is able to use all of the previously predicted pixels neighboring each sub block because a prediction is performed on the basis of the first prediction value 640.

In order to generate a prediction value 711 of a sub block located at a left upper part of the second prediction value 710, the second intra searching unit 422 is able to use all of the pixels 713 neighboring a sub block 641 located at a left upper part of the first prediction value 640. The second intra searching unit 422 searches the previously encoded area 610 of the current picture by using the neighboring pixels 713, thereby generating the prediction value 711.

The left pixels and the upper pixels of the neighboring pixels 713 are pixels included in the previously encoded area 610 of the current picture, and the right pixels and the lower pixels thereof are pixels predicted by the first intraprediction performing unit 410.

In order to generate a prediction value 712 of a sub block located at a right upper part of the second prediction value 710, the second intra searching unit 422 uses neighboring pixels 714 of a sub block 644 located at a right upper part of the first prediction value 640. The second intra searching unit 422 searches the previously encoded area 610 of the current picture by using the neighboring pixels 714, thereby generating the prediction value 712.

The upper pixels of the neighboring pixels 714 are pixels included in the previously encoded area 610 of the current picture, and the left pixels and the lower pixels thereof are pixels predicted by the first intraprediction performing unit 410.

Referring back to FIG. 5B, the second prediction value generating unit 424 generates a second prediction value of the current image processing unit according to a result of the search performed by the second intra searching unit 422.

When the second intra searching unit 422 searches the previously encoded area of the current picture by using the pixels neighboring each of the sub blocks of the first predicted value of the current image processing unit, pixels similar to the neighboring pixels are found from the previously encoded area of the current picture. The second prediction value generating unit 424 determines the sub blocks adjacent to the found similar pixels to be the predicted values of the sub-blocks of the current image processing unit, thereby generating the second prediction value of the current image processing unit.

Alternatively, the second intraprediction performing unit 420 may perform at least once an operation of generating a next prediction value of an image processing unit on the basis of a previous prediction value of the image processing unit, with the second intraprediction value set as an initial value. Accordingly, a prediction value obtained by repeating the predicted value generation a predetermined number of times is the final prediction value, which is set to be a prediction value of the current image processing unit.

In the generation of the last prediction value, a plurality of, namely, M, pixels having small residues (i.e., differences) in relation to the neighboring pixels can be found. M pixels having small residues in relation to the neighboring pixels (e.g., the neighboring pixels 713 and 714) adjacent to each sub block are searched for within the previously encoded area 610 of the current picture. Thus, M blocks adjacent to the found M pixels may be used to generate the last prediction value of each sub block.

For example, M blocks required to predict the sub block 711 shown in FIG. 7 are found, and the last prediction value is generated based on at least one of the M blocks. As for the other sub blocks (e.g., the sub block 712), M blocks needed to predict each of the sub blocks are found within the previously encoded area of the current picture, and the last prediction value is generated based on at least one of the M blocks. A block having the smallest residue in relation to the original sub block to be predicted from the M blocks may be directly used as the prediction value of the original sub block. Alternatively, the prediction value of the original sub block may be obtained by combining a plurality of blocks from the M blocks.

When M blocks are used to predict each subblock, information that specifies a block used to generate the last prediction value of each sub block from among the M blocks needs to be encoded in the encoding unit 320 and inserted into a bitstream.

The prediction value storage unit 426 stores the prediction value generated by the second prediction value generating unit 424. The second intraprediction performing unit 420 may repeat an intraprediction operation a predetermined number of times, in which the next prediction value of a current sub block is generated based on a previous prediction value of the current sub block. In order to do this, the previous prediction value may be stored in the prediction value storage unit 426 and re-used by the second intra searching unit 422.

The number of times the intraprediction repeats is not restricted. As the number of times the intraprediction repeats increases, a more accurate prediction value of the current image processing unit is obtained. The more accurate the intraprediction value of the current image processing unit is, the more the residue (i.e., the difference) between the intraprediction value and actual value of the current image processing unit is reduced. Therefore, the compression rate of image encoding improves.

The encoding unit 320 encodes the residue between the last prediction value of the current image processing unit obtained by the intraprediction unit 310 and the actual value of the current image processing unit and generates a bitstream including the encoded residue. The residue is converted into the frequency domain, quantized, and entropy-encoded to thereby generate a bitstream including data about the current image processing unit. Preferably, the bitstream includes, in an overhead area, information about an intraprediction mode that indicates that the current image processing unit has undergone intraprediction encoding. The information about the intraprediction mode may include the number of times the second intraprediction performing unit 420 has repeated intraprediction.

The information about the encoded current image processing unit is restored back to the original image current unit by the restoration unit 370, de-blocked by the filter 360, and then stored in the frame memory 350. The data about the current image processing unit stored in the frame memory 350 is used as a previously encoded area of the current picture that is to be searched when the next image processing unit is encoded.

Figure 8:
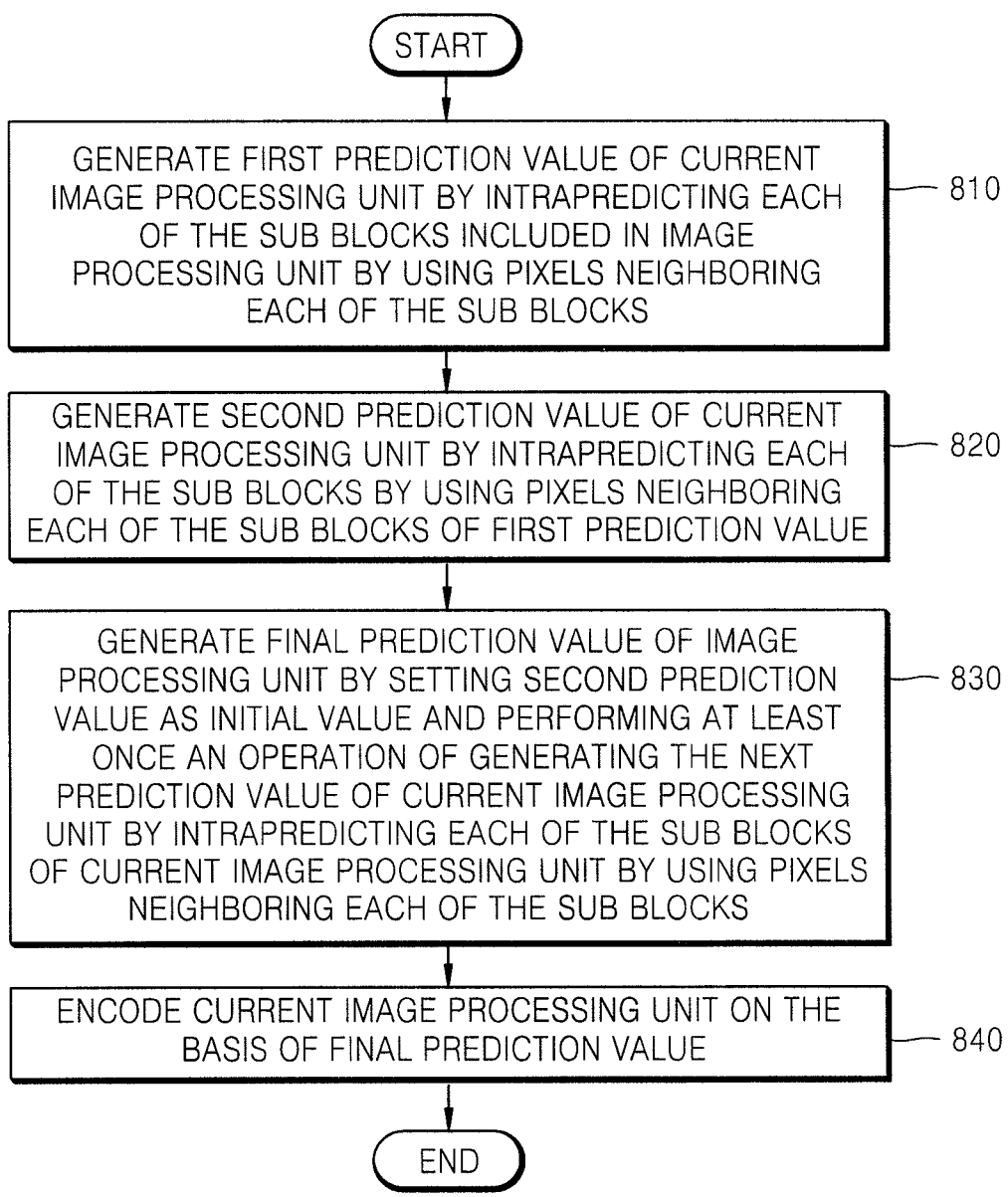
FIG. 8 is a flowchart of an intraprediction encoding method according to an exemplary embodiment of the present invention.

FIG. 8 is a flowchart of an intraprediction encoding method according to an exemplary embodiment of the present invention.

In operation 810, an intraprediction encoding apparatus according to an exemplary embodiment of the present invention generates a first prediction value of a current image processing unit included in a current picture, by intrapredicting the sub blocks included in the image processing unit by using pixels neighboring the sub blocks. The first prediction value of the current image processing unit is generated according to the method illustrated in FIG. 6. Preferably, each of the sub blocks is intrapredicted by searching a previously encoded area of the current picture using the pixels neighboring each of the sub blocks. The pixels neighboring each of the sub blocks may be both pixels included in the previously encoded area of the current picture and pixels included in previously predicted sub blocks of the current image processing unit. Alternatively, the pixels neighboring each of the sub blocks may be only pixels included in the previously encoded area of the current picture. Alternatively, the pixels neighboring each of the sub blocks may be only pixels included in previously predicted sub blocks of the current image processing unit.

In operation 820, the intraprediction encoding apparatus generates a second prediction value of the current image processing unit by intrapredicting each of the sub blocks by using pixels neighboring each of the sub blocks of the first prediction value generated in operation 810.

More specifically, the previously encoded area of the current picture is searched using the pixels neighboring each of the sub blocks included in the first prediction value, and the second prediction value of the current image processing unit is generated on the basis of the result of the search. The neighboring pixels may be pixels adjacent to at least one of the upper, lower, left, and right sides of each of the sub blocks.

In operation 830, with the second prediction value generated in operation 820 set as an initial value, the intraprediction encoding apparatus performs at least once an operation of generating the next prediction value of the current image processing unit by intrapredicting each of the sub blocks of the current image processing unit by using pixels neighboring each of the sub blocks included in the previous prediction value. When the generation of the next prediction value is repeated a predetermined number of times, the final prediction value is generated.

In the generation of the final prediction value, a plurality of, namely, M, pixels having small residues (i.e., differences) in relation to the neighboring pixels can be found. M pixels having small residues in relation to the neighboring pixels (e.g., the neighboring pixels 713 and 714) adjacent to each sub block are searched for within the previously encoded area 610 of the current picture. Thus, M blocks adjacent to the found M pixels may be used to generate the final prediction value of each sub block.

In operation 840, the intraprediction encoding apparatus encodes the current image processing unit on the basis of the final prediction value generated in operation 830. If intraprediction is repeated in operation 830, a more accurate prediction value can be obtained. The current image processing unit is encoded based on the accurate prediction value. In this case, since the prediction value is accurate, a residue between the prediction value and the actual value of the current image processing unit, namely, a difference therebetween, decreases. Therefore, the compression rate of image encoding is improved.

Interprediction encoding will now be described.

Referring back to FIG. 3, the motion estimation unit 330 and the motion compensation unit 340 perform interprediction in which a prediction value of a block to be encoded is searched for within a reference picture. In particular, in order to encode a predetermined image processing unit, the motion estimation unit 310 obtains prediction values of the sub blocks included in the predetermined image processing unit by using pixels neighboring each of the sub blocks. The motion estimation unit 310 obtains more accurate prediction values of the sub blocks by repeating an interprediction process for generating a prediction value. When a final prediction value is generated by repeating the prediction value generation, predicted motion vectors, which are predicted values of the motion vectors of the sub blocks, are generated. This will now be described in greater detail with reference to FIG. 9.

Figure 9:
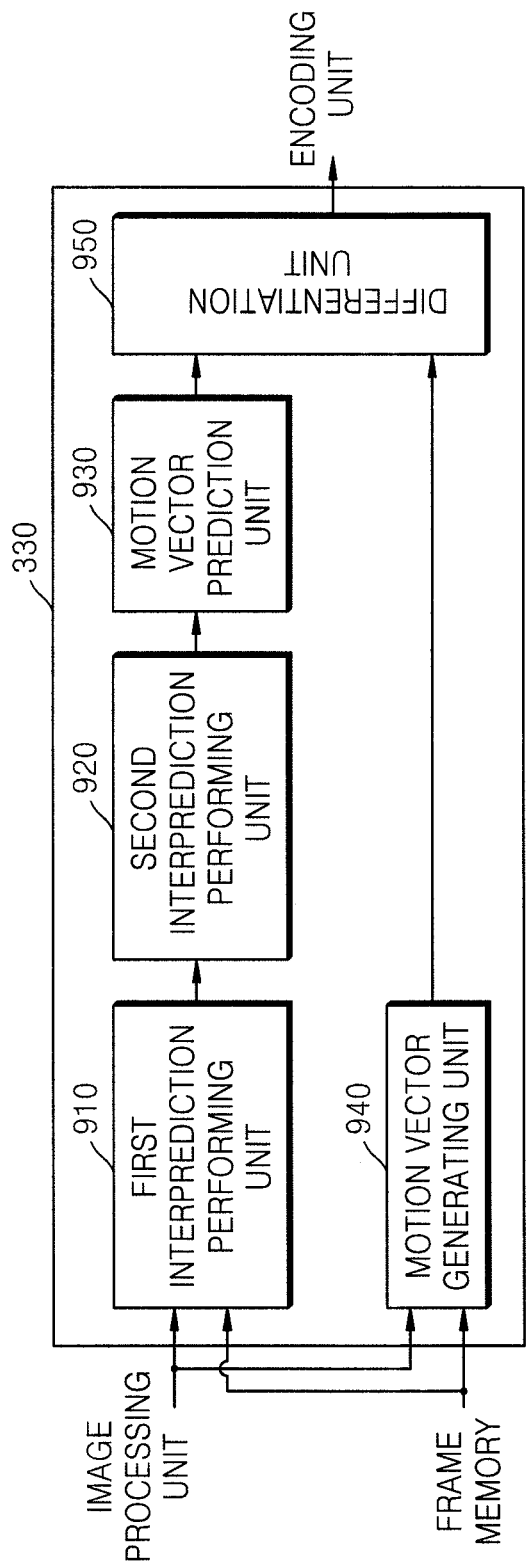
FIG. 9 is a block diagram of a motion estimation unit of the image encoding apparatus shown in FIG. 3.

FIG. 9 is a block diagram of the motion estimation unit 330 of the image encoding apparatus 300 shown in FIG. 3. Referring to FIG. 9, the motion estimation unit 330 includes a first interprediction performing unit 910, a second interprediction performing unit 920, a motion vector predicting unit 930, a motion vector generating unit 940, and a differentiation unit 950.

The first interprediction performing unit 910 performs a first interprediction in which a first prediction value of an image processing unit is generated by inter-predicting the sub blocks of the image processing unit using pixels neighboring the sub blocks. The image processing unit may be a 16×16 macroblock.

Figure 10A:
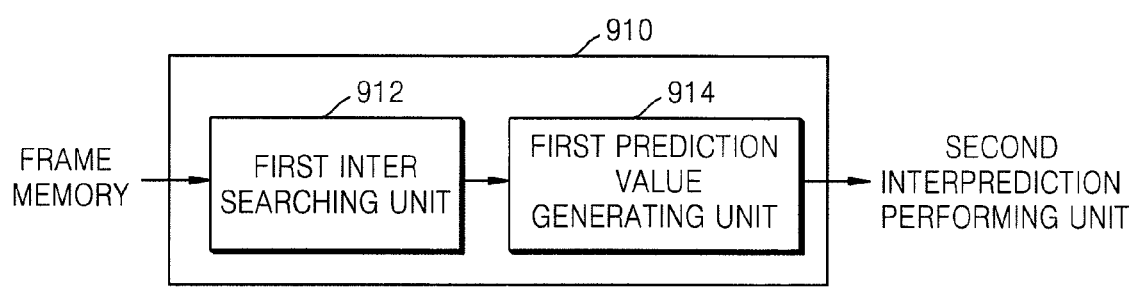
FIG. 10A is a block diagram of a first interprediction performing unit of the motion estimation unit shown in FIG. 9.

FIG. 10A is a block diagram of the first interprediction performing unit 910 of the motion estimation unit 330.

A first inter searching unit 912 included in the first interprediction performing unit 910 generates a prediction value of a current image processing unit by searching a reference picture stored in the frame memory 350 by using pixels neighboring each of the sub blocks of the current image processing unit.

The search is performed using the method described above with reference to FIG. 6. In other words, the search is performed using both pixels that are included in a previously encoded area of a current picture and are neighboring the sub blocks of the current image processing unit and pixels included in previously predicted sub blocks of the current image processing unit. Alternatively, the search is performed using either the former pixels or the latter pixels. In FIG. 6, the previously encoded area 610 of the current picture is searched so as to perform intraprediction. However, the first interprediction performing unit 910 searches the reference picture in order to perform interprediction.

A first prediction value generating unit 914 included in the first interprediction performing unit 910 generates the prediction value of the current image processing unit according to the result of the search performed by the first inter searching unit 912. This generated prediction value is an initially generated prediction value, so it is set to be a first prediction value of the current image processing unit.

When the first inter searching unit 912 performs a search by using the pixels neighboring the sub blocks included in the current image processing unit, pixels similar to the neighboring pixels are searched for within the reference picture. The first prediction value generating unit 914 determines blocks adjacent to the found similar pixels as a prediction value of each of the sub blocks to generate a first prediction value of the current image processing unit.

Referring back to FIG. 9, the second interprediction performing unit 920 generates a second prediction value of the current image processing unit 630 by interpredicting each of the sub blocks of the current image processing unit by using pixels adjacent to each of the sub blocks included in the first prediction value 640. Alternatively, a third prediction value of the current image processing unit may be generated on the basis of the second prediction value, and a fourth prediction value thereof may be generated on the basis of the third prediction value. In this way, such prediction value generation may repeat a predetermined number of times.

The first interprediction performing unit 910 can use only pixels adjacent to a left side and upper side of each of the sub blocks from among the pixels adjacent to all of the four sides thereof when searching the reference picture in order to perform interprediction. However, the second interprediction performing unit 920 performs a search on the basis of the first prediction value of the current image processing unit, which is predicted in the previous stage. Accordingly, when a current sub block is interpredicted, all of the pixels adjacent to the right, left, upper, and lower sides of the current sub block can be used.

Figure 10B:
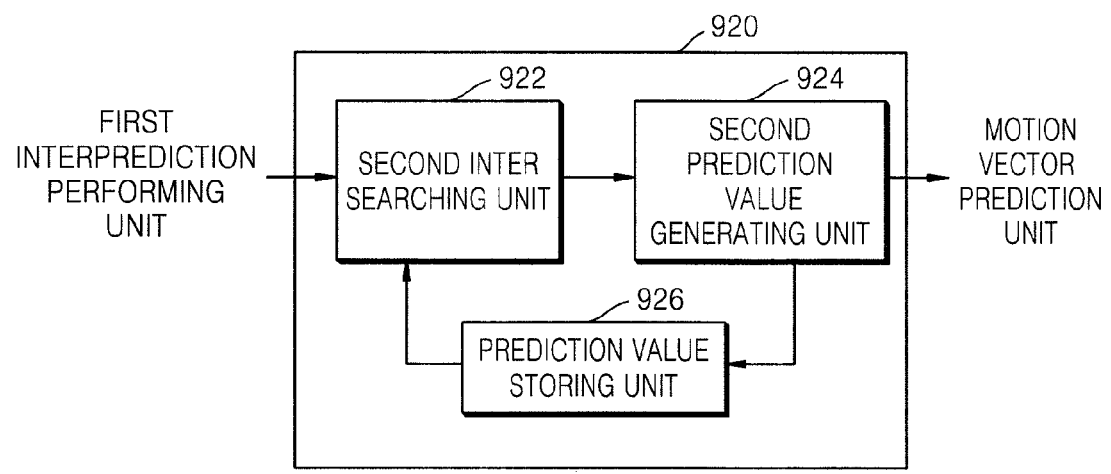
FIG. 10B is a block diagram of a second interprediction performing unit of the motion estimation unit shown in FIG. 9.

FIG. 10B is a block diagram of the second interprediction performing unit 920 of the motion estimation unit 330. Referring to FIG. 10B, the second interprediction performing unit 920 includes a second inter searching unit 922, a second prediction value generating unit 924, and a prediction value storage unit 926.

The second inter searching unit 922 searches a reference picture by using pixels adjacent to each of the sub blocks included in the first prediction value. The search is performed according to the method illustrated in FIG. 7. The only difference between the search performed in the second inter searching unit 922 and the search performed for the intraprediction illustrated in FIG. 7 is that a reference picture instead of the previously encoded area 610 of the current picture is searched. As described above with reference to FIG. 7, the second inter searching unit 922 performs a search on the basis of the previously generated prediction value of the current image processing unit and thus may use all of the pixels neighboring a current sub block.

The second prediction value generating unit 924 generates a prediction value of the current image processing unit according to a result of the search performed by the second inter searching unit 922.

When the second inter searching unit 922 performs a search by using pixels neighboring each of the sub blocks included in the current image processing unit, pixels similar to the neighboring pixels are searched for within the reference picture. The second prediction value generating unit 924 determines blocks adjacent to the found pixels as prediction values of the sub blocks and thus generates a second prediction value of the current image processing unit.

Alternatively, the second interprediction performing unit 920 may perform at least once an operation of generating a next prediction value of an image processing unit on the basis of a previous prediction value of the image processing unit, with the second intraprediction value set as an initial value. Accordingly, a prediction value obtained by repeating the predicted value generation a predetermined number of times is the final prediction value, which is set to be a prediction value of the current image processing unit.

The prediction value storage unit 926 stores the second prediction value generated by the second prediction value generating unit 924. The second interprediction performing unit 920 repeats an interprediction operation a predetermined number of times, in which the next prediction value of a current sub block is generated based on a previous prediction value of the current sub block. In order to do this, the previous prediction value may be stored in the prediction value storage unit 926 and re-used by the second inter searching unit 922.

Referring back to FIG. 9, the motion vector predicting unit 930 generates a predicted motion vector of each of the sub blocks included in the current image processing unit, on the basis of the final prediction value generated by the second interprediction performing unit 920. More specifically, the motion vector predicting unit 930 calculates a relative motion between the blocks of the reference picture used to generate the final prediction value and the sub blocks of the current image processing unit of the current picture and thus generates the predicted motion vector of each of the sub blocks of the current image processing unit.

The motion vector generating unit 940 searches the reference picture by using the actual values of the sub blocks of the current image processing unit, thereby generating an actual motion vector of each of the sub blocks. More specifically, the motion vector generating unit 940 searches the reference picture by using pixels included in the sub blocks instead of using pixels adjacent to the sub blocks, finds blocks similar to the sub blocks, and calculates relative motions between the sub blocks and the found similar blocks, thereby generating motion vectors of the sub blocks. The motion vectors generated by the motion vector generating unit 940 are transmitted to the motion compensation unit 340 and used in motion compensation of the current image processing unit.

The differentiation unit 950 generates a differential between the predicted motion vector generated by the motion vector predicting unit 930 using the final prediction value and the actual motion vector generated by the motion vector generating unit 940. The actual motion vector is not encoded and transmitted but only the differential between the predicted motion vector and the actual motion vector is encoded and transmitted. This improves the compression rate of image encoding. The differential is transmitted to the encoding unit 320 and inserted into the bitstream.

The motion compensation unit 340 performs motion compensation on the current image processing unit on the basis of the actual motion vector generated by the motion estimation unit 330. The motion compensation unit 340 generates a prediction value of the current image processing unit, which is different from the final prediction value generated by the second interprediction performing unit 920. The final prediction value generated by the second interprediction performing unit 920 is used to generate the predicted motion vector of the current image processing unit, whereas the prediction value generated by the motion compensation unit 340 is used to generate the residue of the current image processing unit.

The encoding unit 320 encodes the residue, that is, a difference between the prediction value generated by the motion compensation unit 340 and the actual value of the current image processing unit and generates a bitstream including the encoded residue. The residue is converted into a frequency domain, quantized, and entropy-encoded, thereby generating the bitstream. The encoded residue is restored to its original state by the restoration unit 370, deblocked by the filter 360, and then stored in the frame memory 350. The encoding unit 350 also inserts, into an overhead area of the bitstream, information about an interprediction mode indicating that the current image processing unit has been interprediction-encoded, thereby completing the bitstream. The information about the interprediction mode may include the number of times interprediction according to the present invention is repeated.

The frame memory 350 does not only store the data about the previously encoded area of the current picture for use in intraprediction as described above but also data about the reference picture for use in interprediction.

Figure 11:
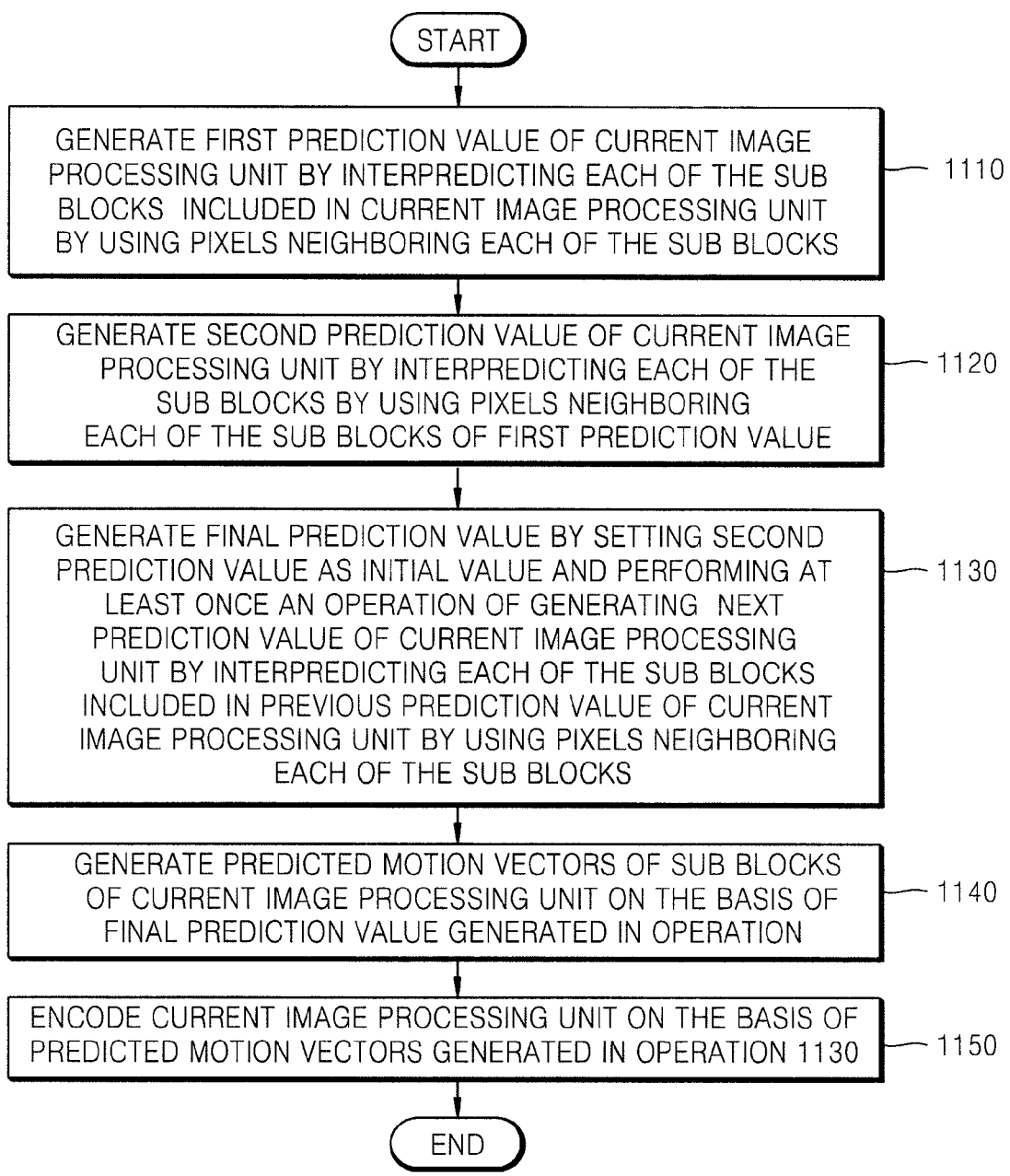
FIG. 11 is a flowchart of an interprediction encoding method according to an exemplary embodiment of the present invention.

FIG. 11 is a flowchart of an interprediction encoding method according to an exemplary embodiment of the present invention.

In operation 1110, an interprediction encoding apparatus according to the present invention performs a first interprediction in which a first prediction value of a current image processing unit included in a current picture is generated by interpredicting the sub blocks included in the image processing unit by using pixels neighboring the sub blocks. Preferably, each of the sub blocks is interpredicted by searching a reference picture using the pixels neighboring each of the sub blocks. The pixels neighboring each of the sub blocks may be both pixels included in the previously encoded area of the current picture and pixels included in previously predicted sub blocks of the current image processing unit. Alternatively, the pixels neighboring each of the sub blocks may be only pixels included in the previously encoded area of the current picture. Alternatively, the pixels neighboring each of the sub blocks may be only pixels included in previously predicted sub blocks of the current image processing unit.

In operation 1120, the interprediction encoding apparatus generates a second prediction value of the current image processing unit by interpredicting each of the sub blocks by using pixels neighboring each of the sub blocks of the first prediction value generated in operation 1110.

More specifically, the reference picture is searched using the pixels neighboring each of the sub blocks included in the first prediction value, and the second prediction value of the current image processing unit is generated on the basis of the result of the search. The neighboring pixels may be pixels adjacent to at least one of the upper, lower, left, and right sides of each of the sub blocks.

In operation 1130, with the second prediction value generated in operation 1120 set as an initial value, the interprediction encoding apparatus performs at least once an operation of generating the next prediction value of the current image processing unit by interpredicting each of the sub blocks included in the previous prediction value of the current image processing unit by using pixels neighboring each of the sub blocks. When the generation of the next prediction value is repeated a predetermined number of times, the final prediction value is generated.

In operation 1140, the interprediction encoding apparatus generates predicted motion vectors of the sub blocks of the current image processing unit on the basis of the final prediction value generated in operation 1130.

More specifically, the predicted motion vector of each of the sub blocks of the current image processing unit is generated by calculating a relative motion between the blocks of the reference picture used to generate the final prediction value and the sub blocks of the current image processing unit of the current picture.

If interprediction is repeated in operation 1130, a more accurate prediction value can be obtained. The predicted motion vectors of the sub blocks are generated based on the more accurate prediction value. In this case, since the predicted vectors are accurate, a differential between the predicted motion vectors and the actual motion vectors decreases. Therefore, the compression rate of image encoding is improved.

In operation 1150, the interprediction encoding apparatus encodes the current image processing unit on the basis of the predicted motion vectors generated in operation 1130.

More specifically, actual motion vectors are calculated, and differentials between the calculated actual motion vectors and the predicted motion vectors are encoded. Motion compensation with respect to the current image processing unit is performed on the basis of the actual motion vectors. A residue between a prediction value generated by the motion compensation and the actual value of the current image processing unit is encoded.

FIGS. 3 through 11 illustrate a method and apparatus for performing intraprediction/interprediction in units of a macroblock which is a unit of image processing. However, it will be easily understood by one of ordinary skill in the art to which the present invention pertains that the unit in which intraprediction/interprediction is performed is not restricted. For example, intraprediction/interprediction may be performed on a picture-by-picture basis.

Figure 12:
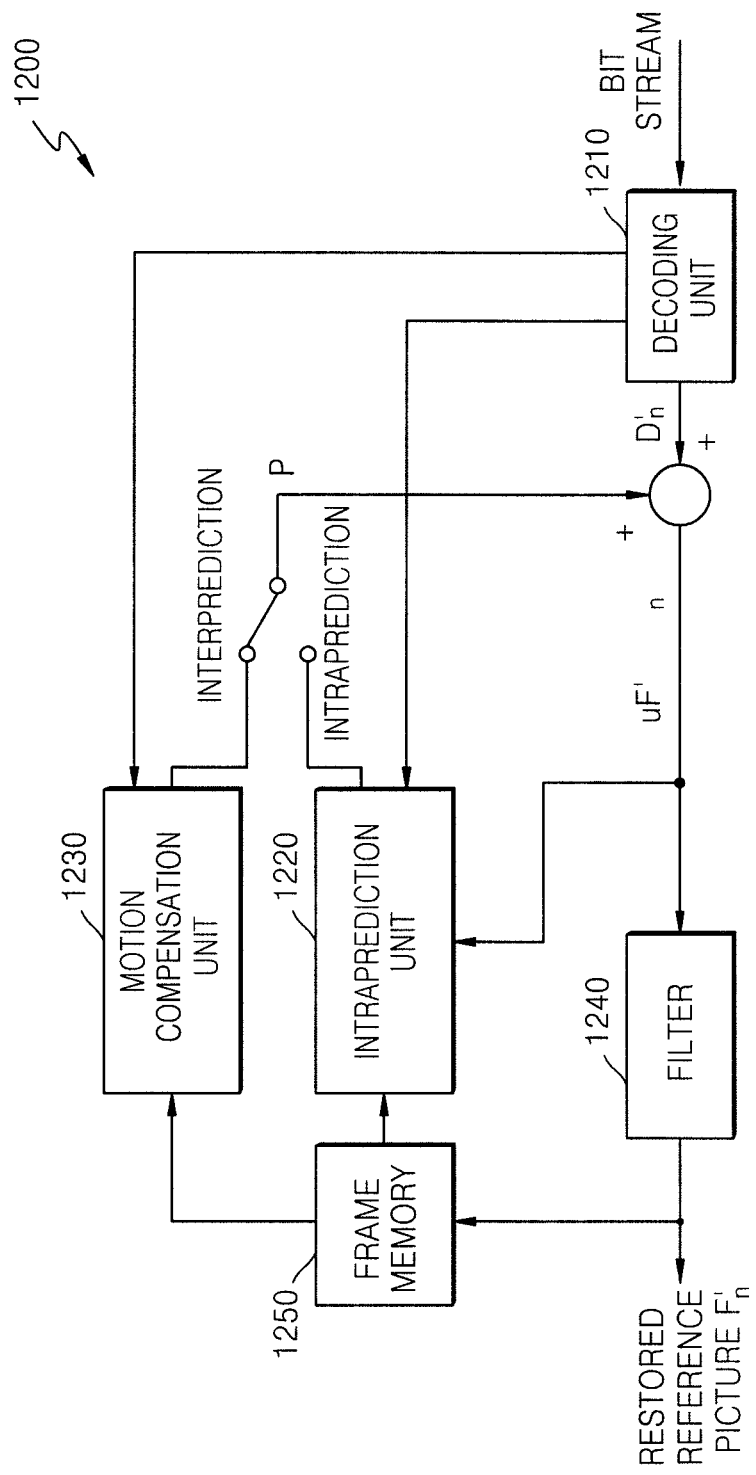
FIG. 12 is a block diagram of an image decoding apparatus according to an exemplary embodiment of the present invention.

FIG. 12 is a block diagram of an image decoding apparatus 1200 according to an exemplary embodiment of the present invention. An image decoding apparatus based on the H.264 standard will now be described, to which an intraprediction/interprediction apparatus according to the present invention is applied. However, it will be easily understood by one of ordinary skill in the art to which the present invention pertains, that the intraprediction/interprediction apparatus according to the present invention may be applied to different types of image decoding apparatuses based on intraprediction/interprediction.

Referring to FIG. 12, the image decoding apparatus 1200 includes a decoding unit 1210, an intraprediction unit 1220, a motion compensation unit 1230, a filter 1240, and a frame memory 1250. The intraprediction unit 1220 and the motion compensation unit 1230 correspond to the intraprediction/interprediction apparatus according to the present invention.

The decoding unit 1210 receives a bitstream including data about a current image processing unit encoded based on intraprediction/interprediction according to the present invention. The data about a current image processing unit includes data about a residue of the current image processing unit.

The decoding unit 1210 also extracts information about an intraprediction/interprediction mode from the received bitstream. The information about an intraprediction/interprediction mode includes information about the number of times inter/interpredictions was performed on the current image processing unit.

Intraprediction decoding will now be described. The intraprediction unit 1220 performs intraprediction on the current image processing unit on the basis of the information about the intraprediction mode extracted from the decoding unit 1210.

Figure 13:
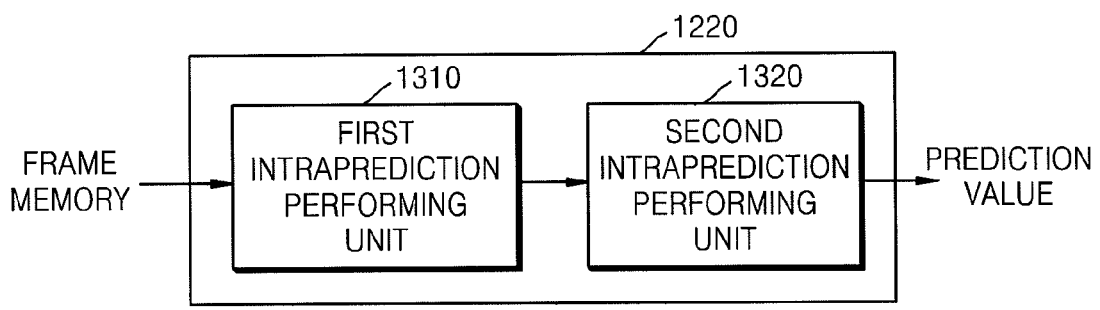
FIG. 13 is a block diagram of an intraprediction unit of the image decoding apparatus shown in FIG. 12.

FIG. 13 is a block diagram of the intraprediction unit 1220 of the image decoding apparatus 1200 shown in FIG. 12. Referring to FIG. 13, the intraprediction unit 1220 includes a first intraprediction performing unit 1310 and a second intraprediction performing unit 1320. The intraprediction decoding is performed according to a method that is symmetrically the same as a method in which intraprediction encoding is performed.

Accordingly, the first intraprediction performing unit 1310 generates a first prediction value of the current image processing unit by intrapredicting the sub blocks included in the current image processing unit by using pixels neighboring each of the sub blocks. Preferably, each of the sub blocks is intrapredicted by searching a previously decoded area of the current picture using the pixels neighboring each of the sub blocks. The pixels neighboring each of the sub blocks may be both pixels included in the previously decoded area of the current picture and pixels included in previously predicted sub blocks of the current image processing unit. Alternatively, the pixels neighboring each of the sub blocks may be only pixels included in the previously decoded area of the current picture. Alternatively, the pixels neighboring each of the sub blocks may be only pixels included in previously predicted sub blocks of the current image processing unit.

This intraprediction is the same as the intraprediction described with reference to FIG. 6 except that a previously decoded area of the current picture is searched instead of the previously encoded area 610 of the current picture being searched when intraprediction encoding.

The second intraprediction performing unit 1320 generates a second prediction value of the current image processing unit by intrapredicting each of the sub blocks of the current image processing unit by using pixels neighboring each of the sub blocks of the first prediction value. Preferably, each of the sub blocks is intrapredicted by searching the previously decoded area of the current picture. With the second prediction value set as an initial value, the second intraprediction performing unit 1320 may perform at least once an operation of generating the next prediction value of the current image processing unit on the basis of the previous prediction value of the current image processing unit. When the generation of the next prediction value is repeated a predetermined number of times, the final prediction value is generated.

This intraprediction is the same as the intraprediction described with reference to FIG. 7 except that a previously decoded area of the current picture is searched instead of the previously encoded area 610 of the current picture being searched when intraprediction encoding.

The final prediction value generated as a result of the intraprediction is added to the residue extracted by the decoding unit 1210. The sum is deblocked and restored by the filter 1240. The restored current image processing unit is stored in the frame memory 1250 and used as a previously encoded area of the current picture upon intraprediction of the next image processing unit.

Figure 14:
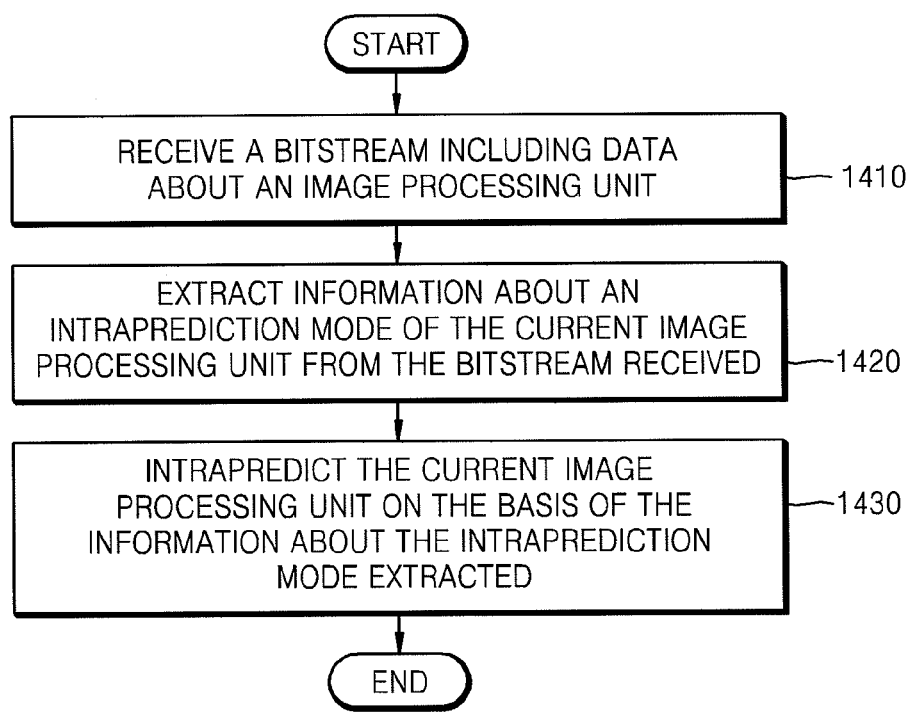
FIG. 14 is a flowchart of an intraprediction decoding method according to an exemplary embodiment of the present invention.

FIG. 14 is a flowchart of an intraprediction decoding method according to an exemplary embodiment of the present invention. Referring to FIG. 14, in operation 1410, an intraprediction decoding apparatus according to an exemplary embodiment of the present invention receives a bitstream including data about an image processing unit encoded according to an intraprediction encoding method according to an exemplary embodiment of the present invention.

In operation 1420, the intraprediction decoding apparatus extracts information about an intraprediction mode of the current image processing unit from the bitstream received in operation 1410. The information about the intraprediction mode includes the number of times intraprediction was performed to encode the current image processing unit.

In operation 1430, the intraprediction decoding apparatus intrapredicts the current image processing unit on the basis of the information about the intraprediction mode extracted in operation 1420. This intraprediction is the same as the intraprediction used when intraprediction encoding except that a previously decoded area of the current picture is searched instead of the previously encoded area 610 of the current picture being searched when intraprediction encoding.

Interprediction decoding will now be described. Referring back to FIG. 12, the motion compensation unit 1230 performs interprediction on the current image processing unit on the basis of the information about the interprediction mode extracted by the decoding unit 1210.

Figure 15:
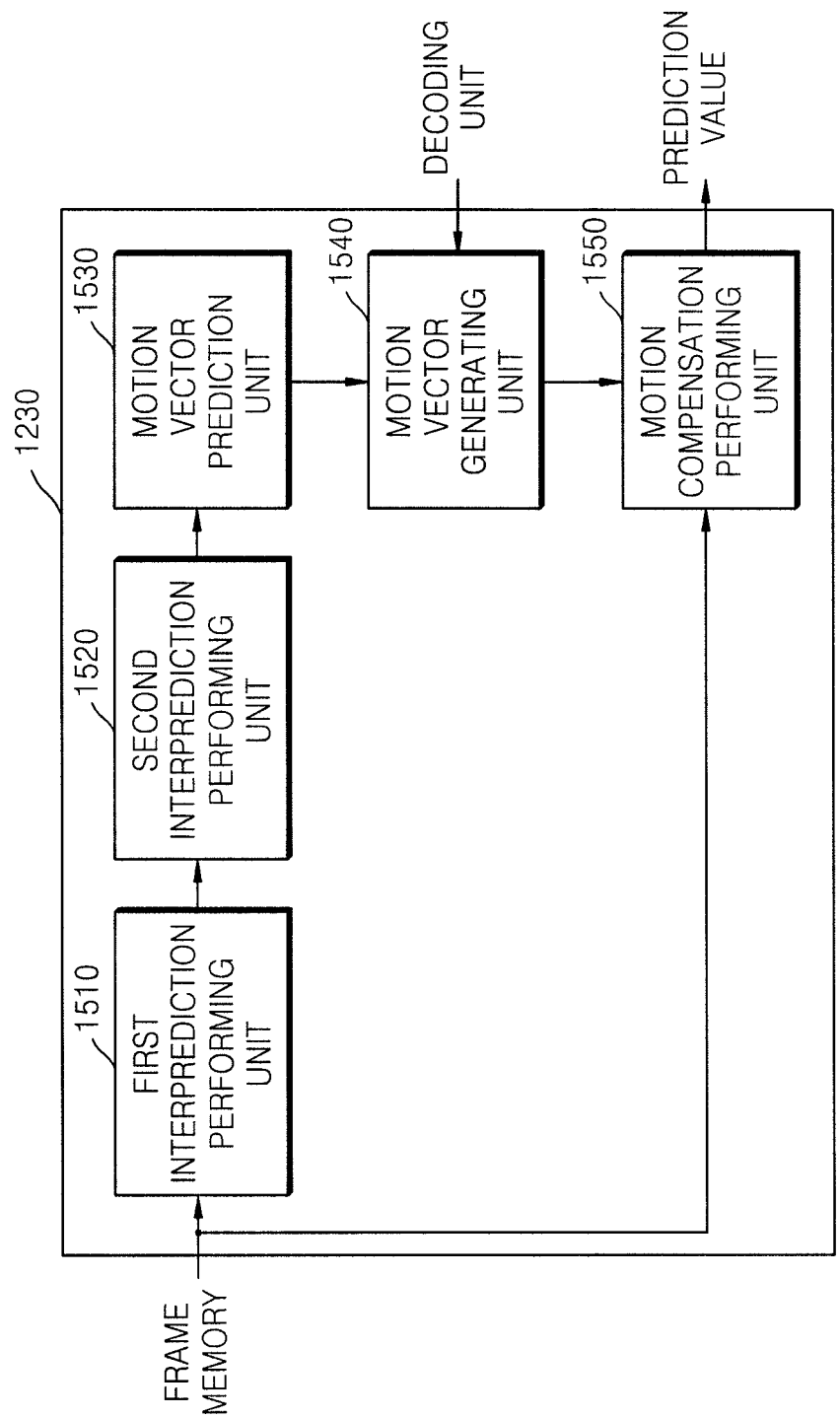
FIG. 15 is a block diagram of a motion compensation unit of the image decoding apparatus shown in FIG. 12.

FIG. 15 is a block diagram of the motion compensation unit 1230 of the image decoding apparatus 1200 shown in FIG. 12. Referring to FIG. 15, the motion compensation unit 1230 includes a first interprediction performing unit 1510, a second interprediction performing unit 1520, a motion vector predicting unit 1530, and a motion vector generating unit 1540. Like the intraprediction decoding, the interprediction decoding is performed according to a method that is symmetrically the same as a method in which interprediction encoding is performed.

Accordingly, the first interprediction performing unit 1510 generates a first prediction value of the current image processing unit by interpredicting the sub blocks included in the current image processing unit by using pixels neighboring each of the sub blocks. Preferably, each of the sub blocks is interpredicted by searching a reference picture using the pixels neighboring each of the sub blocks. The pixels neighboring each of the sub blocks may be both pixels included in the previously decoded area of the current picture and pixels included in previously predicted sub blocks of the current image processing unit. Alternatively, the pixels neighboring each of the sub blocks may be only pixels included in the previously decoded area of the current picture. Alternatively, the pixels neighboring each of the sub blocks may be only pixels included in previously predicted sub blocks of the current image processing unit.

This interprediction is the same as the interprediction described with reference to the motion estimation unit 330 of the image encoding apparatus 300.

The second interprediction performing unit 1520 generates a second prediction value of the current image processing unit by interpredicting each of the sub blocks of the current image processing unit by using pixels neighboring each of the sub blocks of the first prediction value generated by the first interprediction performing unit 1510. The second interprediction performing unit 1520 may perform at least once an operation of generating the next prediction value of the current image processing unit on the basis of the previous prediction value of the current image processing unit. When the generation of the next prediction value is repeated a predetermined number of times, the final prediction value is generated.

This interprediction is the same as the interprediction described with reference to the motion estimation unit 330 of the image encoding apparatus 300.

The motion vector predicting unit 1530 generates a predicted motion vector of each of the sub blocks included in the current image processing unit, on the basis of the final prediction value generated by the second interprediction performing unit 1520. More specifically, the motion vector predicting unit 1530 calculates a relative motion between the blocks of the reference picture used to generate the final prediction value and the sub blocks of the current image processing unit of the current picture and thus generates the predicted motion vector of each of the sub blocks of the current image processing unit.

The motion vector generating unit 1540 generates a motion vector on the basis of the predicted motion vector generated by the motion vector prediction unit 1530 and the differential between the predicted motion vector and actual motion vector extracted by the encoding unit 1210.

The motion compensation performing unit 1550 generates a prediction value of the current image processing unit by searching the reference picture on the basis of the motion vector generated by the motion vector generation unit 1540.

The generated prediction value is added to the residue of the current image processing unit extracted by the decoding unit 1210. The sum is deblocked and restored by the filter 1240. The restored current image processing unit is stored in the frame memory 1250 and used upon decoding of the next picture.

Figure 16:
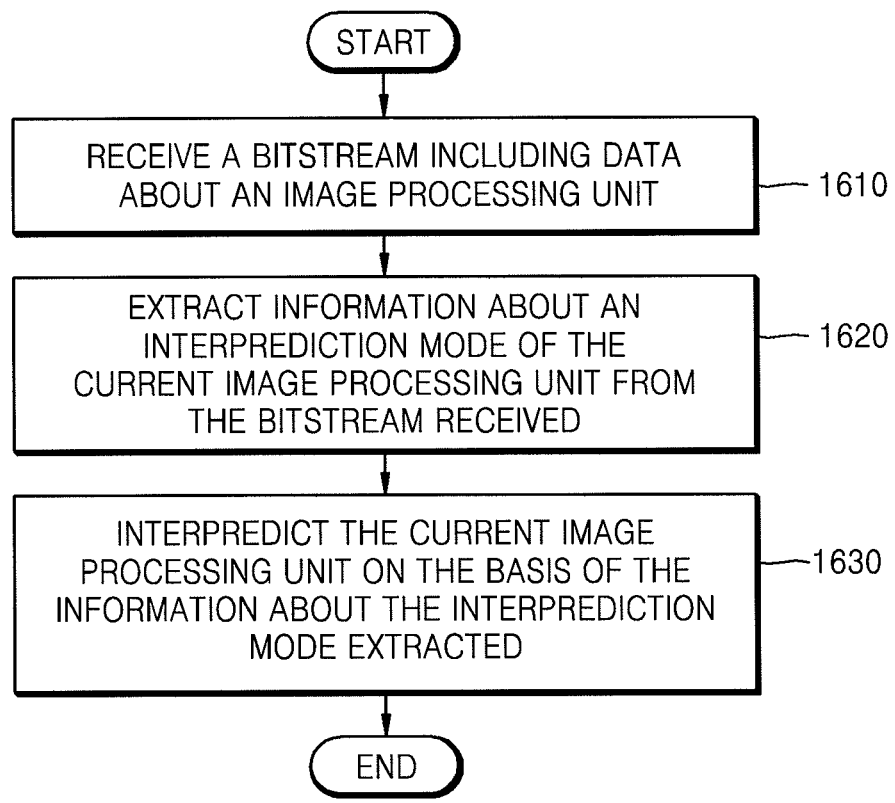
FIG. 16 is a flowchart of an interprediction decoding method according to an exemplary embodiment of the present invention.

FIG. 16 is a flowchart of an interprediction decoding method according to an exemplary embodiment of the present invention. Referring to FIG. 16, in operation 1610, an interprediction decoding apparatus according to an exemplary embodiment of the present invention receives a bitstream including data about an image processing unit encoded according to an interprediction encoding method according to an exemplary embodiment of the present invention.

In operation 1620, the interprediction decoding apparatus extracts information about an interprediction mode of the current image processing unit from the bitstream received in operation 1610. The information about the interprediction mode includes the number of times interprediction was performed to encode the current image processing unit.

In operation 1630, the interprediction decoding apparatus interpredicts the current image processing unit on the basis of the information about the interprediction mode extracted in operation 1620. This interprediction is the same as the intraprediction used when intraprediction encoding.

In the present invention, intraprediction with respect to a predetermined image processing unit can be more accurately performed, so that the compression rate of image encoding is improved.

Moreover, predicted motion vectors of the sub blocks included in the image processing unit can be more accurately generated, so that the compression rate of image encoding is improved.

A system according to the present invention can also be embodied as computer readable codes on a computer readable recording medium or in a transmission medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. Examples of transmission medium include carrier waves and data transmission through the internet. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of intrapredicting an image processing unit of a current picture, the image processing unit including a plurality of sub blocks, the method comprising:
generating a first prediction value of the image processing unit by intrapredicting each of the plurality of sub blocks using pixels neighboring each of the plurality of sub blocks; and
generating a second prediction value of the image processing unit by intrapredicting each of the plurality of sub blocks using the pixels neighboring each of the plurality of sub blocks, used in generating the first prediction value,
wherein the generating of the first prediction value comprises:
searching a previously encoded area of the current picture by using at least one of a group of pixels that are included in the previously encoded area, neighboring the each of the plurality of sub blocks and included in previously encoded image processing units included in the current picture, and a group of pixels that are included in previously predicted sub blocks of the image processing unit; and
generating the first prediction value by intrapredicting the plurality of sub blocks according to a result of the searching.

2. The method of claim 1, wherein the generating of the second prediction value comprises:
searching a previously encoded area of the current picture by using pixels that are neighboring each of the plurality of sub blocks used in generating the first prediction value; and
generating the second prediction value by intrapredicting the plurality of sub blocks according to a result of the searching.

3. The method of claim 2, wherein the neighboring pixels are pixels adjacent to at least one of an upper side, a lower side, a left side, and a right side of each of the plurality of sub blocks used in generating the first prediction value.

4. The method of claim 1, wherein the generating of the first prediction value comprises:
searching a previously decoded area of the current picture by using at least one of a group of pixels that are included in the previously encoded area and are neighboring each of the plurality of sub blocks and a group of pixels that are included in previously predicted sub blocks of the image processing unit; and
generating the first prediction value by intrapredicting the plurality of sub blocks according to a result of the searching.

5. The method of claim 1, wherein the generating of the second prediction value comprises:
searching a previously decoded area of the current picture by using pixels that are neighboring each of the plurality of sub blocks used in generating the first prediction value; and
generating the second prediction value by intrapredicting the sub blocks according to a result of the searching.

6. The method of claim 5, wherein the neighboring pixels are pixels adjacent to at least one of an upper side, a lower side, a left side, and a right side of each of the plurality of sub blocks used in generating the first prediction value.

7. The method of claim 1, further comprising:
generating a final prediction value of the image processing unit by setting the second prediction value as an initial value and performing at least once an operation of generating a next prediction value of the image processing unit by intrapredicting the plurality of sub blocks of the image processing unit by using pixels adjacent to each of the plurality of sub blocks of a previous prediction value.

8. The method of claim 7, wherein the final prediction value is generated by
searching in a previously encoded area of the current picture to find M blocks adjacent to pixels having small residues from the adjacent pixels for each of the plurality of sub blocks of the previous prediction value, and
predicting each of the plurality of sub blocks based on at least one of the found M blocks.

9. The method of claim 7, wherein the final prediction value is generated by
searching in a previously decoded area of the current picture to find M blocks adjacent to pixels having small residues from the adjacent pixels for each of the plurality of sub blocks of the previous prediction value, and
predicting each of the plurality of sub blocks based on at least one of the found M blocks.

10. An apparatus for intrapredicting an image processing unit of a current picture, the image processing unit including a plurality of sub blocks, the apparatus comprising:
a first intraprediction performing unit which generates a first prediction value of the image processing unit by intrapredicting each of the plurality of sub blocks using pixels neighboring each of the plurality of sub blocks; and
a second intraprediction performing unit which generates a second prediction value of the image processing unit by intrapredicting each of the plurality of sub blocks using the pixels neighboring each of the plurality of sub blocks, used in generating the first prediction value,
wherein the first intraprediction performing unit comprises:
a first intra searching unit which searches, in a search, a previously encoded area of the current picture by using at least one of a group of pixels that are included in the previously encoded area, neighboring the each of the plurality of sub blocks and included in previously encoded image processing units included in the current picture, and a group of pixels that are included in previously predicted sub blocks of the image processing unit; and
a first prediction value generation unit which generates the first prediction value by intrapredicting the plurality of sub blocks according to a result of the search.

11. The apparatus of claim 10, wherein the second intraprediction performing unit comprises:
a second intra searching unit which searches, in a search, a previously encoded area of the current picture by using pixels that are neighboring each of the plurality of sub blocks used in generating the first prediction value; and a second prediction value generation unit which generates the second prediction value by intrapredicting the plurality of sub blocks according to a result of the search.

12. The apparatus of claim 11, wherein the neighboring pixels are pixels adjacent to at least one of an upper side, a lower side, a left side, and a right side of each of the plurality of sub blocks used in generating the first prediction value.

13. The apparatus of claim 10, wherein the first intraprediction performing unit comprises:
a first intra searching unit which searches, in a search, a previously decoded area of the current picture by using at least one of a group of pixels that are included in a previously encoded area and are neighboring each of the plurality of sub blocks and a group of pixels that are included in previously predicted sub blocks of the image processing unit; and
a first prediction value generation unit which generates the first prediction value by intrapredicting the plurality of sub blocks according to a result of the search.

14. The apparatus of claim 10, wherein the second intraprediction performing unit comprises:
a second intra searching unit which searches, in a search, a previously decoded area of the current picture by using pixels that are neighboring each of the plurality of sub blocks used in generating the first prediction value; and
a second prediction value generation unit which generates the second prediction value by intrapredicting the plurality of sub blocks of the first prediction value according to a result of the search.

15. The apparatus of claim 14, wherein the neighboring pixels are pixels adjacent to at least one of an upper side, a lower side, a left side, and a right side of each of the plurality of sub blocks used in generating the first prediction value.

16. The apparatus of claim 10, wherein the second intraprediction performing unit generates a final prediction value of the image processing unit by setting the second prediction value as an initial value and performing at least once an operation of generating a next prediction value of the image processing unit by intrapredicting the plurality of sub blocks of the image processing unit by using pixels adjacent to each of the plurality of sub blocks of a previous prediction value.

17. The apparatus of claim 16, wherein the final prediction value is generated by
searching in a previously encoded area of the current picture to find M blocks adjacent to pixels having small residues from the adjacent pixels for each of the plurality of sub blocks of the previous prediction value, and
predicting each of the plurality of sub blocks based on at least one of the found M blocks.

18. The apparatus of claim 16, wherein the final prediction value is generated by
searching in a previously decoded area of the current picture to find M blocks adjacent to pixels having small residues from the adjacent pixels for each of the plurality of sub blocks of the previous prediction value, and
predicting each of the plurality of sub blocks based on at least one of the found M blocks.

19. An intraprediction encoding method comprising an intrapredicting method comprising:
generating a first prediction value of the image processing unit by intrapredicting each of the plurality of sub blocks using pixels neighboring each of the plurality of sub blocks; and
generating a second prediction value of the image processing unit by intrapredicting each of the plurality of sub blocks using the pixels neighboring each of the plurality of sub blocks, used in generating the first prediction value,
wherein the generating of the first prediction value comprises:
searching a previously encoded area of the current picture by using at least one of a group of pixels that are included in the previously encoded area, neighboring the each of the plurality of sub blocks and included in previously encoded image processing units included in the current picture, and a group of pixels that are included in previously predicted sub blocks of the image processing unit; and
generating the first prediction value by intrapredicting the plurality of sub blocks according to a result of the searching.

20. An intraprediction decoding method comprising an intrapredicting method comprising:
generating a first prediction value of the image processing unit by intrapredicting each of the plurality of sub blocks using pixels neighboring each of the plurality of sub blocks; and
generating a second prediction value of the image processing unit by intrapredicting each of the plurality of sub blocks using the pixels neighboring each of the plurality of sub blocks, used in generating the first prediction value,
wherein the generating of the first prediction value comprises:
searching a previously encoded area of the current picture by using at least one of a group of pixels that are included in the previously encoded area, neighboring the each of the plurality of sub blocks and included in previously encoded image processing units included in the current picture, and a group of pixels that are included in previously predicted sub blocks of the image processing unit; and
generating the first prediction value by intrapredicting the plurality of sub blocks according to a result of the searching.

21. An intraprediction encoding apparatus comprising an intrapredicting apparatus comprising:
a first intraprediction performing unit which generates a first prediction value of the image processing unit by intrapredicting each of the plurality of sub blocks using pixels neighboring each of the plurality of sub blocks; and
a second intraprediction performing unit which generates a second prediction value of the image processing unit by intrapredicting each of the plurality of sub blocks using the pixels neighboring each of the sub blocks used in generating the first prediction value,
wherein the first intraprediction performing unit comprises:
a first intra searching unit which searches, in a search, a previously encoded area of the current picture by using at least one of a group of pixels that are included in the previously encoded area, neighboring the each of the plurality of sub blocks and included in previously encoded image processing units included in the current picture, and a group of pixels that are included in previously predicted sub blocks of the image processing unit; and
a first prediction value generation unit which generates the first prediction value by intrapredicting the plurality of sub blocks according to a result of the search.

22. An intraprediction decoding apparatus comprising an intrapredicting apparatus comprising:
a first intraprediction performing unit which generates a first prediction value of the image processing unit by intrapredicting each of the plurality of sub blocks using pixels neighboring each of the plurality of sub blocks; and
a second intraprediction performing unit which generates a second prediction value of the image processing unit by intrapredicting each of the plurality of sub blocks using the pixels neighboring each of the sub blocks used in generating the first prediction value,
wherein the first intraprediction performing unit comprises:
a first intra searching unit which searches, in a search, a previously encoded area of the current picture by using at least one of a group of pixels that are included in the previously encoded area, neighboring the each of the plurality of sub blocks and included in previously encoded image processing units included in the current picture, and a group of pixels that are included in previously predicted sub blocks of the image processing unit; and
a first prediction value generation unit which generates the first prediction value by intrapredicting the plurality of sub blocks according to a result of the search.

23. A method of interpredicting an image unit included in a current picture, the method comprising:
generating a first prediction value of the image unit by interpredicting each of a plurality of sub blocks of the image unit using pixels spatially neighboring each of the plurality of sub blocks of the image unit; and
generating a second prediction value of the image unit by interpredicting the each of the plurality of sub blocks of the image unit using pixels spatially neighboring each of a plurality of sub blocks of the first prediction value of the image unit,
wherein the generating the first prediction value by interpredicting comprises:
searching a reference picture by using at least one of a group of pixels that are spatially neighboring the each of the plurality of sub blocks of the image unit and included in at least one of previously encoded image units included in the current picture, and a group of pixels that are included in at least one previously predicted sub block of the image unit; and
generating the first prediction value of the image unit by interpredicting the each of the plurality of sub blocks of the image unit according to a result of the searching.

24. The method of claim 23, wherein the generating the second prediction value by interpredicting comprises:
searching the reference picture by using the pixels that are spatially neighboring the each of the plurality of sub blocks of the first prediction value of the image unit; and
generating the second prediction value of the image unit by interpredicting the each of the plurality of sub blocks of the image unit according to a result of the searching.

25. The method of claim 24, wherein the spatially neighboring pixels are pixels adjacent to at least one of an upper side, a lower side, a left side, and a right side of the each of the plurality of sub blocks of the first prediction value of the image unit.

26. The method of claim 23, further comprising generating a final prediction value of the image unit by setting the second prediction value as an initial value and performing at least once an operation of generating a next prediction value of the image unit by interpredicting the plurality of sub blocks of the image unit by using pixels adjacent to each of the plurality of sub blocks of a previous prediction value of the image unit.

27. The method of claim 26, further comprising generating predicted motion vectors of the plurality of sub blocks of the image unit based on the final prediction value.

28. An apparatus for interpredicting an image unit included in a current picture, the apparatus comprising:
a first interprediction unit which generates a first prediction value of the image unit by interpredicting each of a plurality of sub blocks of the image unit using pixels spatially neighboring each of the plurality of sub blocks of the image unit; and
a second interprediction unit which generates a second prediction value of the image unit by interpredicting the each of the plurality of sub blocks of the image unit using pixels spatially neighboring each of a plurality of sub blocks of the first prediction value of the image unit,
wherein the first interprediction unit comprises:
a first inter searching unit which searches a reference picture by using at least one of a group of pixels that are spatially neighboring the each of the plurality of sub blocks of the image unit and included in at least one of previously encoded image units included in the current picture, and a group of pixels that are included in at least one previously predicted sub block of the image unit; and
a first prediction value generating unit which generates the first prediction value of the image unit by interpredicting the each of the plurality of sub blocks of the image unit according to a result of the searching the reference picture.

29. The apparatus of claim 28, wherein the second interprediction unit comprises:
a second inter searching unit which searches the reference picture by using the pixels that are spatially neighboring the each of the plurality of sub blocks of the first prediction value of the image unit; and
a second prediction value generating unit which generates the second prediction value of the image unit by interpredicting the each of the plurality of sub blocks of the image unit according to a result of the searching the reference picture.

30. The apparatus of claim 29, wherein the spatially neighboring pixels are pixels adjacent to at least one of an upper side, a lower side, a left side, and a right side of the each of the plurality of sub blocks of the first prediction value of the image unit.

31. The apparatus of claim 28, wherein the second interprediction performing unit generates a final prediction value of the image unit by setting the second prediction value as an initial value and performing at least once an operation of generating a next prediction value of the image unit by interpredicting the plurality of sub blocks of the image unit by using pixels adjacent to each of the plurality of sub blocks of a previous prediction value of the image unit.

32. The apparatus of claim 31, further comprising a motion vector prediction unit which generates predicted motion vectors of the plurality of sub blocks of the image unit based on the final prediction value.

33. An interprediction encoding method comprising:
generating a first prediction value of the image unit by interpredicting each of a plurality of sub blocks of the image unit using pixels spatially neighboring each of the plurality of sub blocks of the image unit; and
generating a second prediction value of the image unit by interpredicting the each of the plurality of sub blocks of the image unit using pixels spatially neighboring each of a plurality of sub blocks of the first prediction value of the image unit, wherein the generating the first prediction value by interpredicting comprises:

searching a reference picture by using at least one of a group of pixels that are spatially neighboring the each of the plurality of sub blocks of the image unit and included in at least one of previously encoded image units included in the current picture, and a group of pixels that are included in at least one previously predicted sub block of the image unit; and generating the first prediction value of the image unit by interpredicting the each of the plurality of sub blocks of the image unit according to a result of the searching;

generating a difference between a predicted motion vector and an actual motion vector of the each of the plurality of sub blocks of the image unit, and a difference between the two motion vectors of the each of the plurality of sub blocks of the image unit, wherein the predicted motion vector is generated based on the second prediction value, and the actual motion vector is generated based on an actual value of the each of the plurality of sub blocks of the image unit;

generating a residue between a prediction value of the image unit generated based on the actual motion vector and the actual value of the plurality of sub blocks of the image unit; and encoding the difference and the residue.

34. An interprediction decoding method comprising an interpredicting method comprising:

generating a first prediction value of the image unit by interpredicting each of a plurality of sub blocks of the image unit using pixels spatially neighboring each of the plurality of sub blocks of the image unit; and generating a second prediction value of the image unit by interpredicting the each of the plurality of sub blocks of the image unit using pixels spatially neighboring each of a plurality of sub blocks of the first prediction value of the image unit, wherein the generating the first prediction value by interpredicting comprises:

searching a reference picture by using at least one of a group of pixels that are spatially neighboring the each of the plurality of sub blocks of the image unit and included in at least one of previously encoded image units included in the current picture, and a group of pixels that are included in at least one previously predicted sub block of the image unit; and generating the first prediction value of the image unit by interpredicting the each of the plurality of sub blocks of the image unit according to a result of the searching.

35. An interprediction encoding apparatus comprising:

a first interprediction unit which generates a first prediction value of the image unit by interpredicting each of a plurality of sub blocks of the image unit using pixels spatially neighboring each of the plurality of sub blocks of the image unit; and a second interprediction unit which generates a second prediction value of the image unit by interpredicting the each of the plurality of sub blocks of the image unit using pixels spatially neighboring each of a plurality of sub blocks of the first prediction value of the image unit, wherein the first interprediction unit comprises:

a first inter searching unit which searches a reference picture by using at least one of a group of pixels that are spatially neighboring the each of the plurality of sub blocks of the image unit and included in at least one of previously encoded image units included in the current picture, and a group of pixels that are included in at least one previously predicted sub block of the image unit; and a first prediction value generating unit which generates the first prediction value of the image unit by interpredicting the each of the plurality of sub blocks of the image unit according to a result of the searching the reference picture;

a motion estimation unit which generates a difference between a predicted motion vector and an actual motion vector of the each of the plurality of sub blocks of the image unit, and a difference between the two motion vectors of the each of the plurality of sub blocks of the image unit, wherein the predicted motion vector is generated based on the second prediction value, and the actual motion vector is generated based on an actual value of the each of the plurality of sub blocks of the image unit;

a motion estimation unit which generates a residue between a prediction value of the image unit generated based on the actual motion vector and the actual value of the plurality of sub blocks of the image unit; and an encoding unit which encodes the difference and the residue.

36. An interprediction decoding apparatus comprising an interpredicting apparatus comprising:

a first interprediction unit which generates a first prediction value of the image unit by interpredicting each of a plurality of sub blocks of the image unit using pixels spatially neighboring each of the plurality of sub blocks of the image unit; and a second interprediction unit which generates a second prediction value of the image unit by interpredicting the each of the plurality of sub blocks of the image unit using pixels spatially neighboring each of a plurality of sub blocks of the first prediction value of the image unit, wherein the first interprediction unit comprises:

a first inter searching unit which searches a reference picture by using at least one of a group of pixels that are spatially neighboring the each of the plurality of sub blocks of the image unit and included in at least one of previously encoded image units included in the current picture, and a group of pixels that are included in at least one previously predicted sub block of the image unit; and a first prediction value generating unit which generates the first prediction value of the image unit by interpredicting the each of the plurality of sub blocks of the image unit according to a result of the searching the reference picture.

* * * * *